(12) United States Patent
Kodaira et al.

(10) Patent No.: US 12,097,650 B2
(45) Date of Patent: Sep. 24, 2024

(54) MULTI-MOLD SYSTEMS USING A RUNNER

(71) Applicants: CANON VIRGINIA, INC., Newport News, VA (US); CANON U.S.A., INC., Melville, NY (US)

(72) Inventors: Koki Kodaira, Tokyo (JP); Yuichi Yanahara, Moriyama (JP); Junko Tajima, Amsterdam (NL)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 164 days.

(21) Appl. No.: 17/299,272

(22) PCT Filed: Dec. 2, 2019

(86) PCT No.: PCT/US2019/064035
§ 371 (c)(1),
(2) Date: Jun. 2, 2021

(87) PCT Pub. No.: WO2020/117691
PCT Pub. Date: Jun. 11, 2020

(65) Prior Publication Data
US 2022/0032519 A1    Feb. 3, 2022

Related U.S. Application Data

(60) Provisional application No. 62/776,384, filed on Dec. 6, 2018.

(51) Int. Cl.
*B29C 45/27*    (2006.01)
*B29C 31/04*    (2006.01)
*B29C 45/17*    (2006.01)

(52) U.S. Cl.
CPC ............ *B29C 45/27* (2013.01); *B29C 31/042* (2013.01); *B29C 45/1706* (2013.01); *B29C 2045/1709* (2013.01)

(58) Field of Classification Search
CPC ...................................................... B29C 45/27
See application file for complete search history.

(56) References Cited

U.S. PATENT DOCUMENTS

| 3,241,191 A | 3/1966 | Nouel |
| 3,241,192 A | 3/1966 | Nouel et al. |

(Continued)

FOREIGN PATENT DOCUMENTS

| CN | 1242735 A1 | 1/2000 |
| CN | 106626266 A | 5/2017 |

(Continued)

OTHER PUBLICATIONS

Machine translation KR20130059848A (Year: 2013).*
Machine translation JPH09169045A (Year: 1997).*
Machine translation JP2009379892A (Year: 2009).*

*Primary Examiner* — Jacob T Minskey
*Assistant Examiner* — Wayne K. Swier
(74) *Attorney, Agent, or Firm* — Canon U.S.A., Inc., IP Division

(57) ABSTRACT

A runner for supplying resin to a cavity includes a sprue that is supplied resin from a nozzle of an injection molding machine, a first path formed in the runner, where the resin flows in the first path from the nozzle when the nozzle connects to the sprue, a first pin that moves to a first position to increase the size of the first path before the resin is supplied to the first path and moves to a second position to decrease the size of the first path before the nozzle separates from the sprue.

11 Claims, 30 Drawing Sheets

(56) References Cited

U.S. PATENT DOCUMENTS

| | | | |
|---|---|---|---|
| 3,608,150 | A | 9/1971 | Laufer et al. |
| 4,810,181 | A | 3/1989 | Ozawa |
| 5,589,202 | A | 12/1996 | Okano et al. |
| 6,632,079 | B1 | 10/2003 | Kazmer |
| 7,022,278 | B2 | 4/2006 | Colonico |
| 7,404,713 | B2 | 7/2008 | Goinski |
| 7,972,132 | B2 | 7/2011 | Klobucar et al. |
| 2004/0191357 | A1 | 9/2004 | Babin |
| 2006/0204610 | A1 | 9/2006 | Nakaya et al. |
| 2009/0028986 | A1 | 1/2009 | Vasapoli et al. |
| 2019/0118440 | A1 | 4/2019 | Moriya et al. |

FOREIGN PATENT DOCUMENTS

| | | | |
|---|---|---|---|
| JP | S48-008346 | B | 3/1973 |
| JP | S537446 | U | 6/1978 |
| JP | 55-017569 | A | 2/1980 |
| JP | S62-299316 | A | 12/1987 |
| JP | 63-130321 | A | 6/1988 |
| JP | 09-169045 | A | 6/1997 |
| JP | H09169045 | A | 6/1997 |
| JP | H10-100207 | A | 4/1998 |
| JP | 11-48294 | A | 2/1999 |
| JP | 2002513687 | A | 5/2002 |
| JP | 2009279892 | A | 5/2008 |
| JP | 2010-234541 | A | 10/2010 |
| JP | 5090206 | B2 | 12/2012 |
| JP | 2016-112771 | A | 6/2016 |
| KR | 20130059848 | A | 6/2013 |
| WO | 98/19846 | A1 | 5/1998 |
| WO | 01/60580 | A1 | 8/2001 |

\* cited by examiner

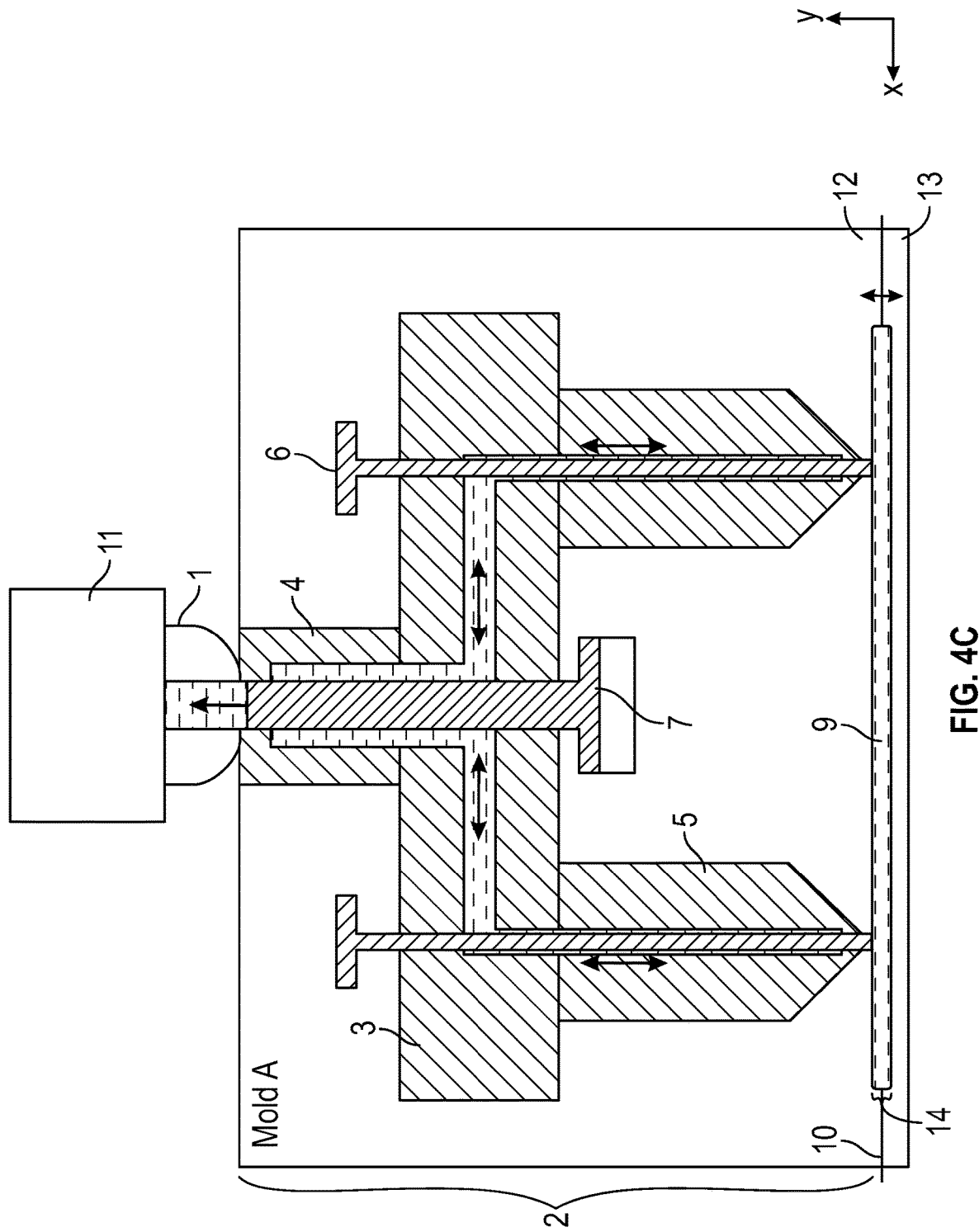

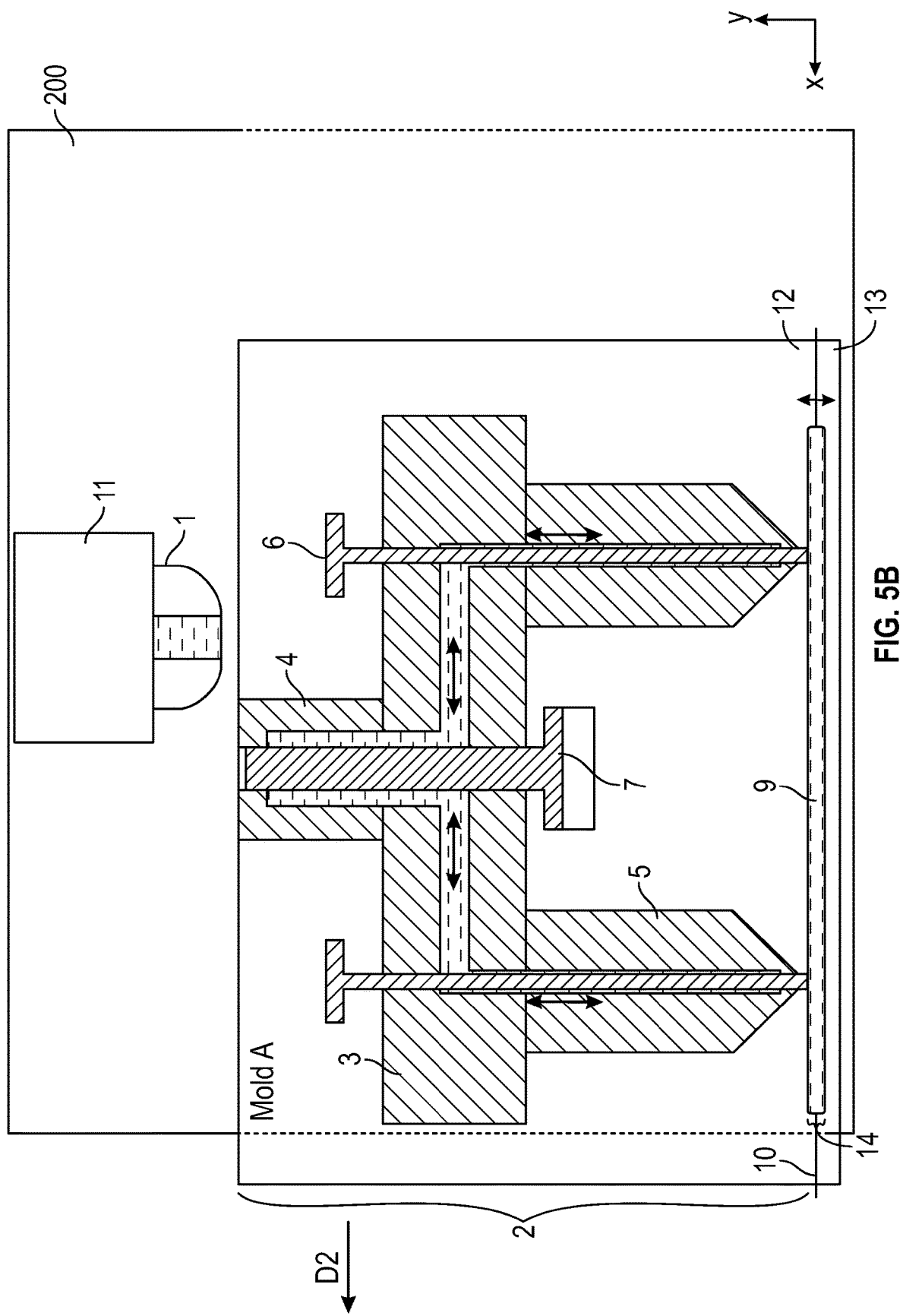

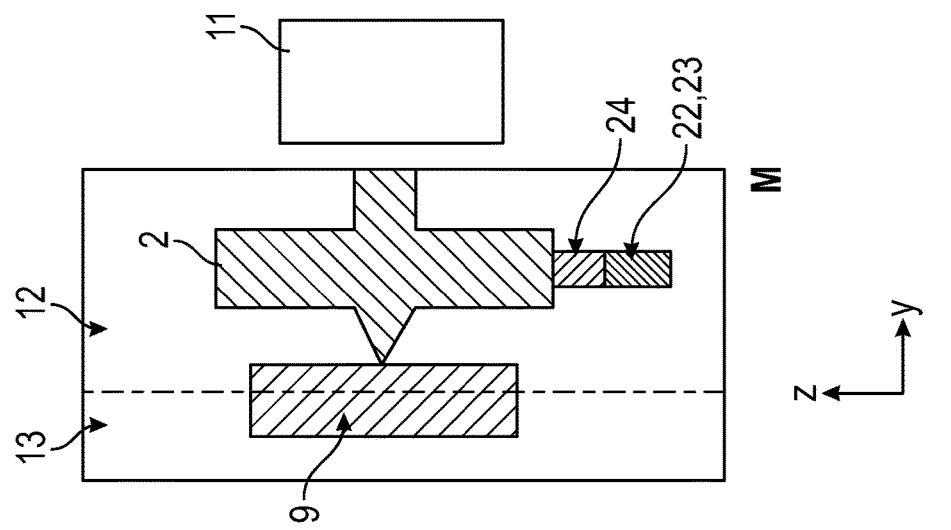
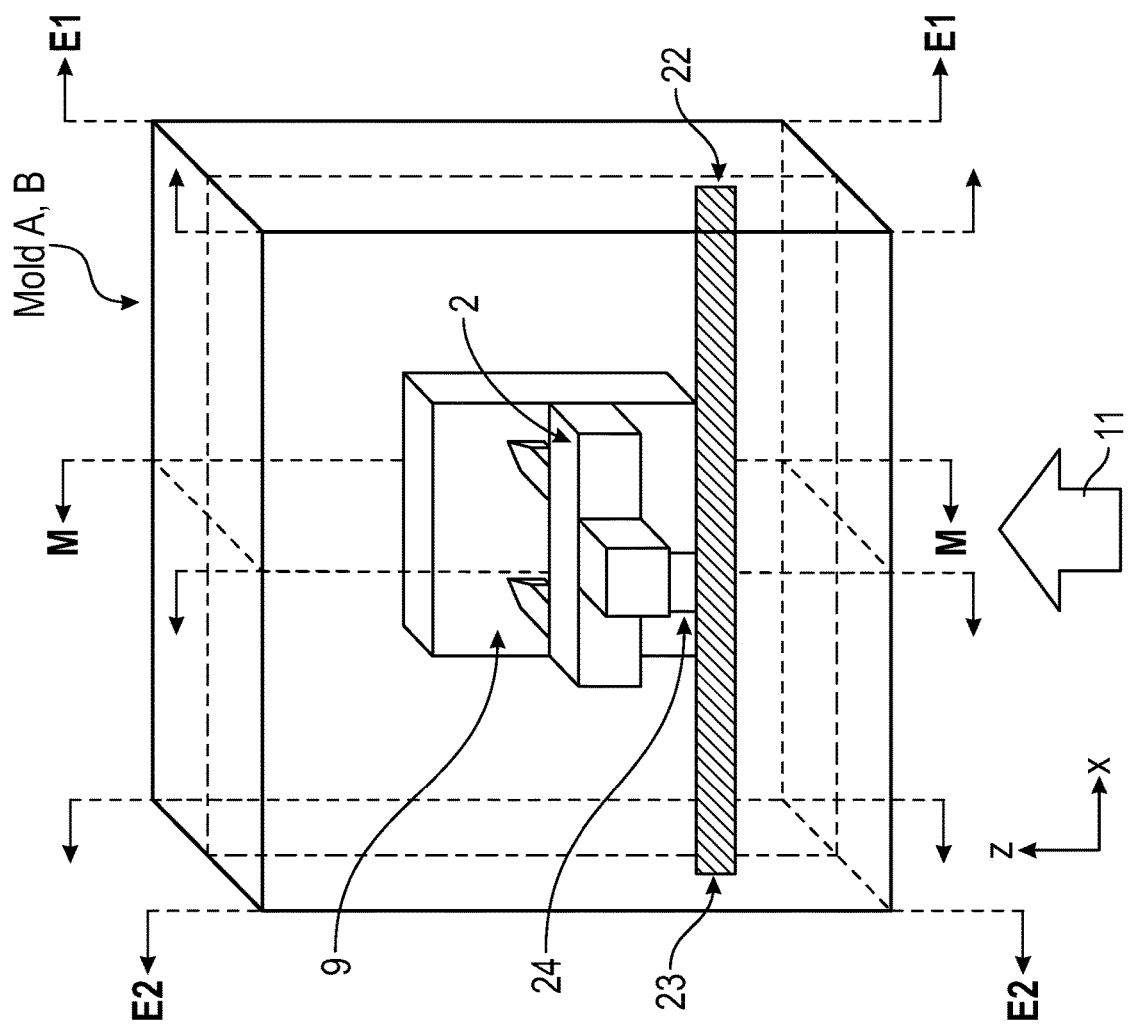
FIG. 14B
FIG. 14A

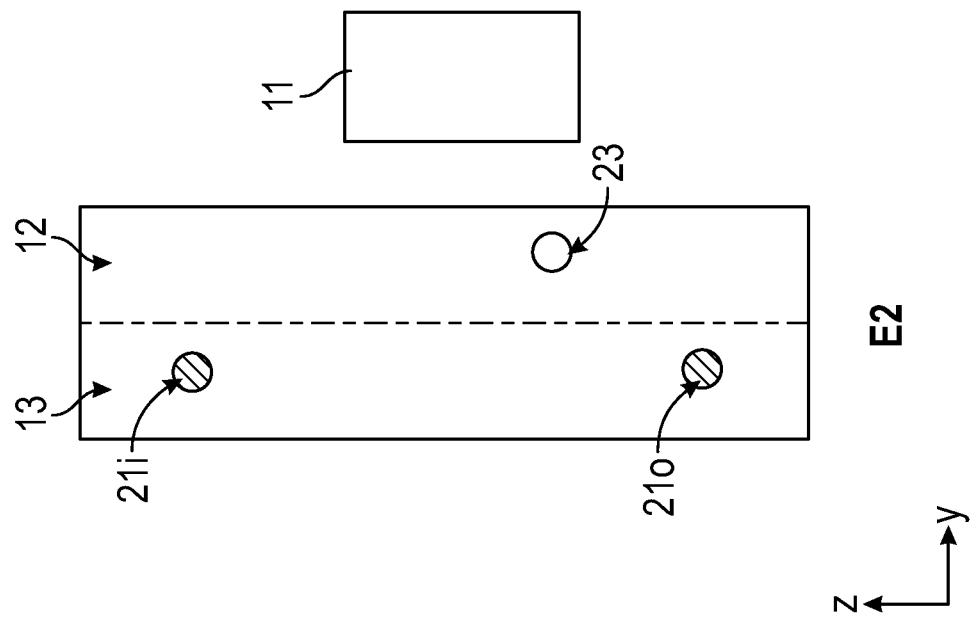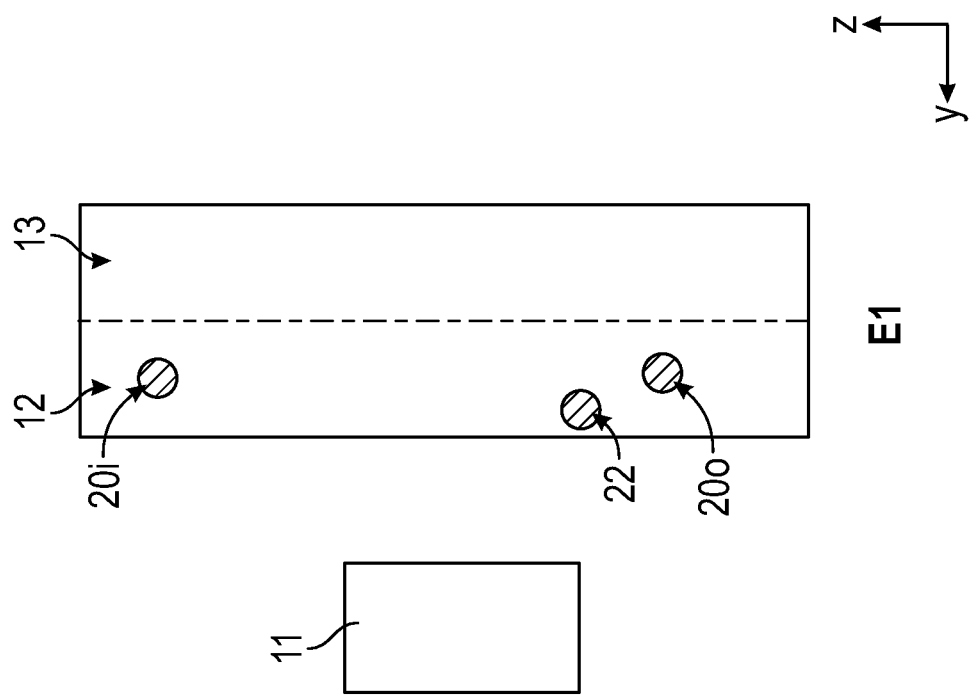

MULTI-MOLD SYSTEMS USING A RUNNER

CROSS REFERENCE TO RELATED APPLICATION

This application is a National Phase Application of PCT Application No. PCT/US2019/064035, filed on Dec. 2, 2019 which claims the benefit of U.S. Provisional Patent Application 62/776,384, filed Dec. 6, 2018, all of which are incorporated by reference herein in its entirety.

BACKGROUND

Technical Field

This application generally relates to reducing resin leaks from a hot runner.

Background

When separating an injection molding machine nozzle from a hot runner, the pressure applied inside the hot runner is lowered, while resin contained inside the hot runner reverses flow out of the hot runner. If the resin leaks external to the hot runner and the pressure inside the hot runner drops, air entering the hot runner can cause an air bubble to form in the molded part.

US2006/0204610 discloses the installation of a seal element with a spring inside the hot runner. The spring lengthens due to the pressure difference of the pressure inside the hot runner and the atmospheric pressure when separating the injection molding machine nozzle from the hot runner. The seal element closes off an opening of the resin supply path of the hot runner, preventing the resin from leaking.

When utilizing a spring element to seal the resin flow path, as in US2006/0204610, resin of the volume of the spring portion and of the volume of the material around the spring leaks from the hot runner. In addition, the more the resin that leaks, the more the pressure inside the hot runner drops. This enables easier generation of air bubbles. The resin lengthens into strings between the nozzle and the hot runner because the leaked resin attaches to the separated nozzle side. The resin lengthened into strings can move to other locations within the injection molding machine depending on the movement of the nozzle. This can generate clogging, and disable continuous molding.

If multiple molds repeat moving between the injection position of the injection molding machine and a position external to the injection molding machine, and if the piping accompanying the molds protrudes in the direction towards the inside of the injection molding machine when viewed from the molds, there is a possibility that maintenance will be difficult and the piping will easily jam in the injection molding machine during the movement.

What is needed is a multiple mold system that addresses and overcomes the above-described issues.

SUMMARY

According to aspects of the present disclosure, resin leaking can be reduced from a hot runner. As a result, the possibility of pinching in of resin in parts of the injection molding machine, stopping the injection molding machine and air entering the molded parts when conducting continuous molding can be reduced.

According to at least one aspect of the present disclosure, a runner for supplying resin to a cavity includes a sprue configured to be supplied resin from a nozzle of an injection molding machine, a first path formed in the runner, wherein the resin flows in the first path from the nozzle when the nozzle contacts the sprue, and a first pin configured to move to a first position to increase a size of first path before the resin is supplied to the first path and to move to a second position decrease the size of the first path before the nozzle separates from the sprue.

BRIEF DESCRIPTION OF DRAWINGS

FIGS. 4A-4C illustrate part of a molding operation process.

FIGS. 5A-5D illustrate part of a molding operation process.

FIGS. 14A-14C illustrate installation of connectors.

FIGS. 16A-16B illustrate connection elements.

DETAILED DESCRIPTION OF THE EMBODIMENTS

An exemplary embodiment of the present disclosure will be described in detail below with reference to the accompanying drawings. The following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1:
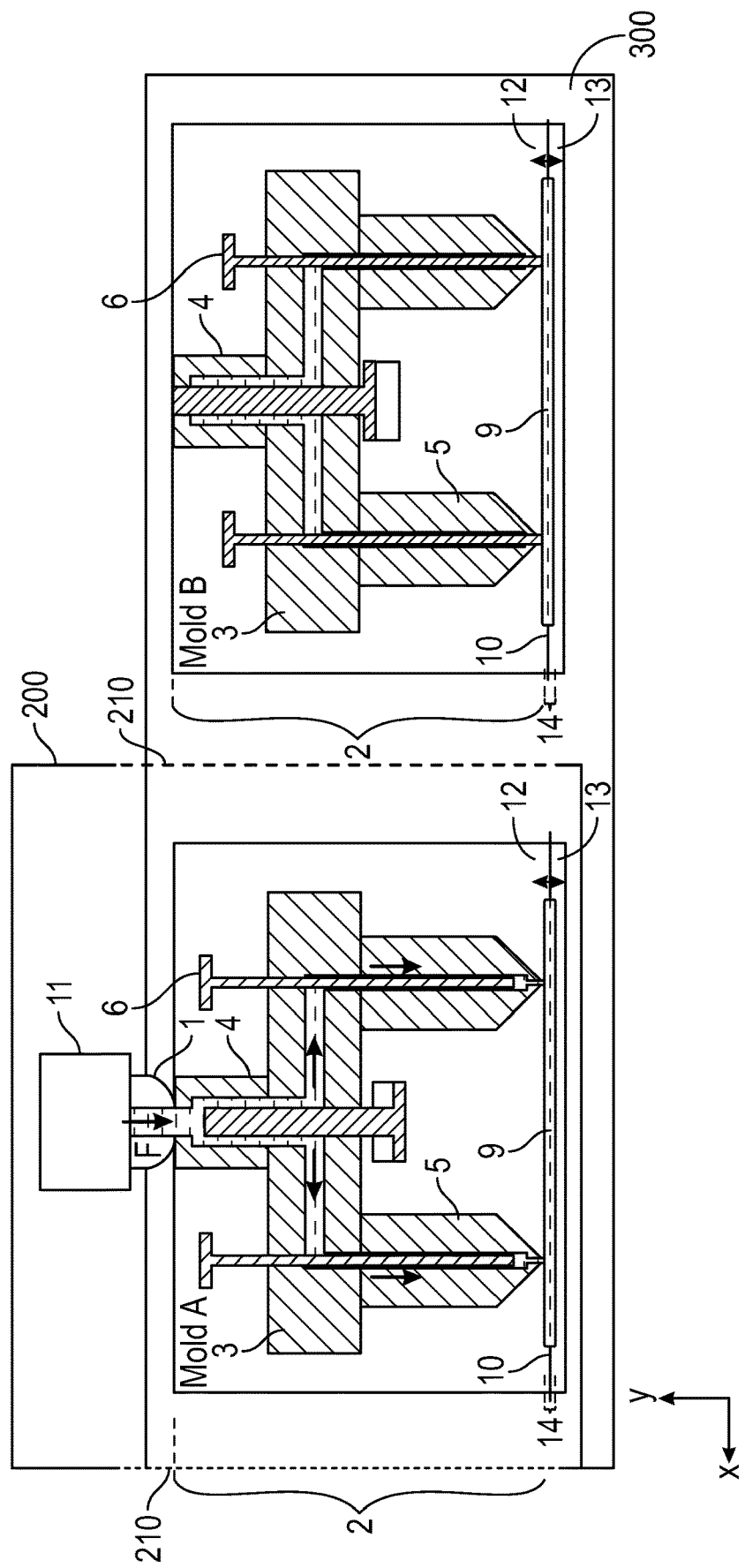
FIG. 1 illustrates a top view of an injection molding system.

FIG. 1 is illustrating a top view of the injection molding system according to the present exemplary embodiment. More specifically, a multi-mold system, where the process of cooling down one mold while ejecting a molded part from another mold and injecting resin into the other mold.

An injection molding machine cylinder 11 is an injection cylinder of an injection molding machine 200, and enables the injection of resin to the mold through an injection molding machine nozzle 1 by melting and injecting the resin.

The injection molding machine nozzle 1 is attached to the end of the injection molding machine 200. Injection of resin to a hot runner 2 is performed by applying pressure to the injection molding machine nozzle side 1 inside the injection molding machine cylinder 11. The injection molding machine nozzle 1 has a pull-back (suck back) function, which enables returning any resin left behind in the tip of the injection molding machine nozzle 1 or that leaked from the tip area of the injection molding machine nozzle 1 to the injection molding machine cylinder 11 side of the injection molding system.

The hot runner 2 maintains the resin temperature at an arbitrary temperature. This enables avoiding cooling down and disposing of the resin inside the runner upon each injection to the mold as with a cold runner that is normally used, thus avoiding resin disposal of the runner area. The hot runner 2 contains a sprue 4, a manifold 3 and a hot runner nozzle 5, and forms a flow path the resin passes through from the injection molding machine cylinder 11 to the mold.

The sprue 4 includes a heater (not illustrated), and is the portion where the injection molding machine nozzle 1 and the mold make contact, and, is part of the resin flow path. The manifold 3 includes a heater (not illustrated), and is the portion where the sprue 4 and the hot runner nozzle 5 make contact, and is part of the resin flow path.

The hot runner nozzle 5 includes a heater (not illustrated), and enables the resin flowing from the manifold 3 to flow into a cavity 14. The tip of the hot runner nozzle 5 is narrow and is equipped with a valve pin 6 that can open and close an opening in the tip. It is possible to conduct injection molding continuously without disposing of the resin located inside the runner due to each element possessing the function to maintain the temperature in this manner.

The resin first passes from the injection molding machine cylinder 11 through the injection molding machine nozzle 1, and is injected to the hot runner 2 by the pressure from the injection molding machine 200. Then, the resin passes through the sprue 4 located inside the hot runner 2, and then through the manifold 3, where it flows to the hot runner nozzle 5. As described below, opening and closing with the valve pin 6 is possible because the inner diameter of the hot runner nozzle 5 is narrow.

The resin supplied from the injection molding machine nozzle 1 passes through the resin flow path of the sprue 4, the manifold 3, and the hot runner nozzle 5, which constitute the hot runner 2, and flows into the cavity 14, which represents a void space inside of a stationary-side mold 12 and a moving-side mold 13. Flow direction F indicates the direction in which the resin flows when it is injected from the injection molding machine cylinder 11 to the mold. As a result, a resin molded part 9 is formed inside cavity 14. A mold parting line 10 indicates the parting line of the stationary-side mold 12 and the moving-side mold 13. A cart 300 is installed along the X-axis, and a rail or an actuator (not illustrated), described below, for moving the mold are placed on the cart 300.

As illustrated in FIG. 1, two types of resin molded parts are created by conducting injection to mold A and mold B with a single injection molding machine 200. An opening 210 is formed at each of the side surfaces of the injection molding machine 200. The opening 210 is illustrated as a dotted line in FIG. 1. The mold A and the mold B are alternately inserted into and ejected from the injection molding machine 200 through the openings 210. The mold A and the mold B both consist of the stationary-side mold 12 and the moving-side mold 13, and resin molding is performed by injecting resin from the hot runner 2 to the cavity 14 between the stationary side mold 12 and the moving side mold 13. The mold A and the mold B are each connected to the hot runner 2.

The following describes the injection molding method of the present exemplary embodiment.

First, molten resin injection/pressure holding is performed from the injection molding machine nozzle 1 to the mold A (or the mold B), and then the injection molding machine nozzle 1 separates from the mold A. The mold A is transported outside the injection molding machine 200, where it is cooled. In parallel, the mold B is transported into the injection molding machine 200, where the injection molding machine nozzle 1 proceeds towards and contacts with the mold B.

Next, if there is a resin molded part in the mold B, it is removed, and molten resin injection/pressure holding performed with respect to the mold B after removal of the resin molded part. After the injection molding machine nozzle 1 separates from the mold B, the mold B is transported outside the injection molding machine 200, where it cools. In parallel, the mold A is transported into the injection molding machine 200, where the injection molding machine nozzle 1 proceeds towards and contacts with the mold A. Then, the resin molded part is removed from inside the mold A, and molten resin injection/pressure holding performed with respect to the mold A.

As described, the injection molding machine 200 repeats connecting to and separating from a mold, and repeats transporting a mold into and out of the injection molding machine 200.

Based on the present exemplary embodiment, while removing the resin molded part from the injection molding machine 200 and injecting resin into one mold, cooling of the resin injected into another mold occurs. This enables an increase in the efficiency of production by alternately cooling of multiple molds, i.e., the mold A and the mold B, and removing and injecting the molded part.

Figure 2:
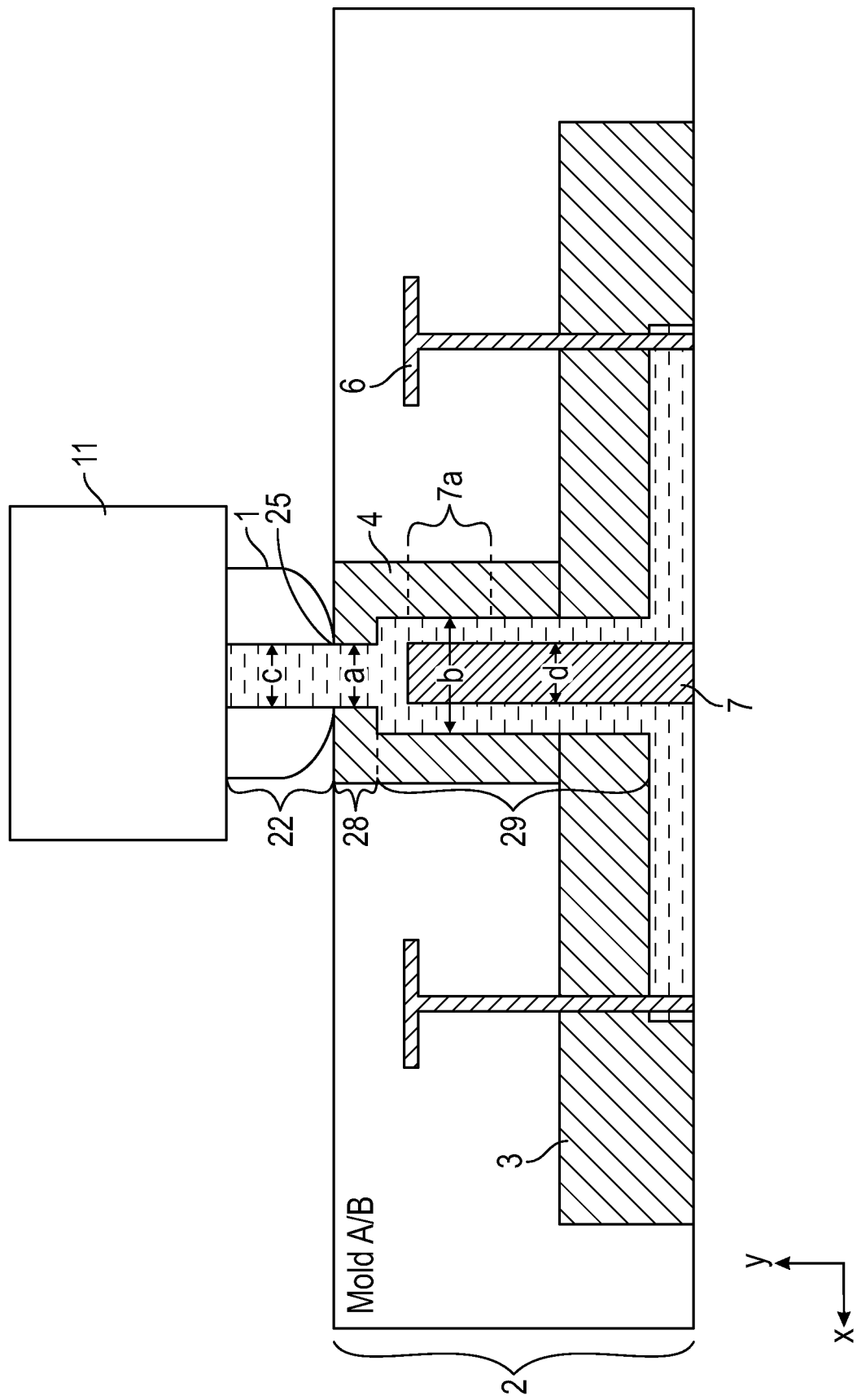
FIG. 2 is an enlargement view of a nozzle touch area where an injection molding machine nozzle connects to a sprue.

FIG. 2 illustrates an enlargement view of a nozzle contact area 25 where the injection molding machine nozzle 1 connects to the sprue 4. As previously described, the hot runner 2 connects to both the mold A and the mold B.

The distances "a-c" indicate the inner diameter of each of the above-described elements. Distance "a" indicates the inner diameter of the $1^{st}$ resin flow path 28 within the sprue 4. Distance "b" indicates the inner diameter of the $2^{nd}$ resin flow path 29 within the sprue 4. Distance "c", indicates the inner diameter of resin flow path 22 within the injection molding machine nozzle 1. The relation between the various inner diameters is: $c \leq a < b$.

The cross-section area of the $2^{nd}$ resin flow path 29 within the sprue 4 is greater than the $1^{st}$ resin flow path 28 within the sprue 4, and it is configured so that no pressure loss of the resin injected from the injection molding machine nozzle 1 is generated due to the resin flow path narrowing inside the sprue 4. When resin is flowing from the injection molding machine nozzle 1 to the hot runner 2, resin will flow from the $1^{st}$ resin flow path 28 inside the sprue 4 in the direction towards the $2^{nd}$ resin flow path 29 inside the sprue 4. After the injection molding machine nozzle 1 separates from the sprue 4, resin can leak out of the sprue 4 because the resin flows from the $2^{nd}$ resin flow path 29 inside the sprue 4 in the direction of the 1st resin flow path 28 inside the sprue 4.

As illustrated in FIG. 2, if the inner diameter of the 1st resin flow path 28 inside the sprue 4 is "a", and the inner diameter of the $2^{nd}$ resin flow path 29 inside the sprue 4 is "b", the relation of a<b holds true. By making "a" smaller than "b", the pressure to push out the resin from the $2^{nd}$ resin flow path 29 inside the sprue 4 to the $1^{st}$ resin flow path 28 inside the sprue 4 increases. This makes it more difficult for the resin to leak out from the sprue 4. The shape of the resin flow path in the hot runner 2 is not limited to the above-described shape. In another exemplary embodiment, the resin flow path can be tapered toward the injection molding machine nozzle 1, where the inner diameter of the resin flow path can change gradually.

The outer diameter of an end portion 7a of a sprue pin 7, described below, is indicated by "d", where the relation of d=a exists. The sprue pin 7 closes off the exit of the sprue 4 to prevent resin from leaking out from the sprue 4 or from entering into the sprue 4. When the sprue pin 7 moves forward to the injection molding machine nozzle 1 side, the sprue pin 7 can seal off the injection molding machine nozzle 1 because the inner diameters are equal (d=a). More specifically, the size of the resin flow path decreases.

By making the sprue pin 7 smaller, it is possible to decrease the amount of resin that is pushed out from the sprue 4 based on the motion of the sprue pin 7. The sprue pin 7 is a simple rod shape, and because it only moves to the injection molding machine nozzle 1 side, making the sprue pin 7 smaller results in only scant resin leakage being generated. The amount of the scant resin leak corresponds to the amount of movement of the sprue pin 7. If there is only scant resin leak, the possibility of the resin lengthening into strings or air entering into the sprue 4 is low.

The outer diameter "d" of the end portion 7a of the sprue pin 7 can be smaller to ensure easier movement of the sprue pin 7 inside the injection molding machine nozzle 1.

The end of the sprue pin 7 on the injection molding machine nozzle 1 side should not contact the injection molding machine nozzle 1 when the injection molding machine nozzle 1 contacts the sprue 4. Avoiding a collision with the sprue pin 7 when the injection molding machine nozzle 1 attaches to/detaches from the mold can lengthen the life of the sprue pin 7.

The above description discussed, the diameter of the flow path is, but the cross-section shape of the flow path does not necessarily need to be round. The relation of the cross-section area of the flow path is cross-section area (1st resin flow path 28 inside the sprue)<cross-section area ($2^{nd}$ resin flow path 29 inside the sprue).

Figure 3:
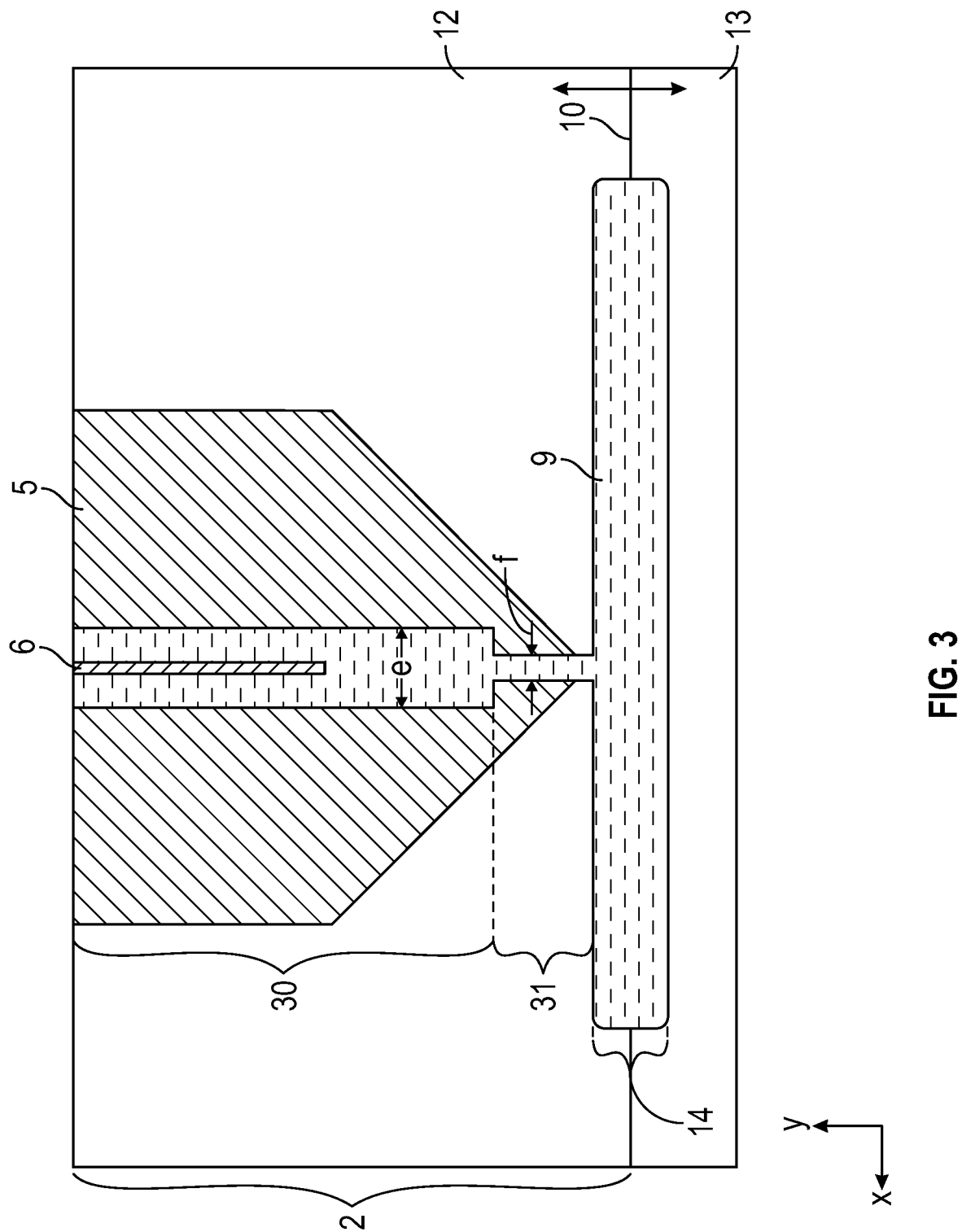
FIG. 3 is an enlargement view of a hot runner nozzle and a resin molded part of a mold.

FIG. 3 illustrates an enlargement view of the hot runner nozzle 5 and the resin molded part 9 of the mold A or the mold B. Distances "e" and "f" indicate the inner diameter of above-described elements. Distance "e" indicates the inner diameter of $1^{st}$ resin flow path 30 inside the hot runner nozzle 5. Distance "f" indicates the inner diameter of $2^{nd}$ resin flow path 31 inside the hot runner nozzle 5. The relation of the inner diameter is: f<e. This enables easier closing off of the hot runner nozzle 5 with the valve pin 6 due to the narrowing of the tip of the hot runner nozzle 5.

Figure 4A:
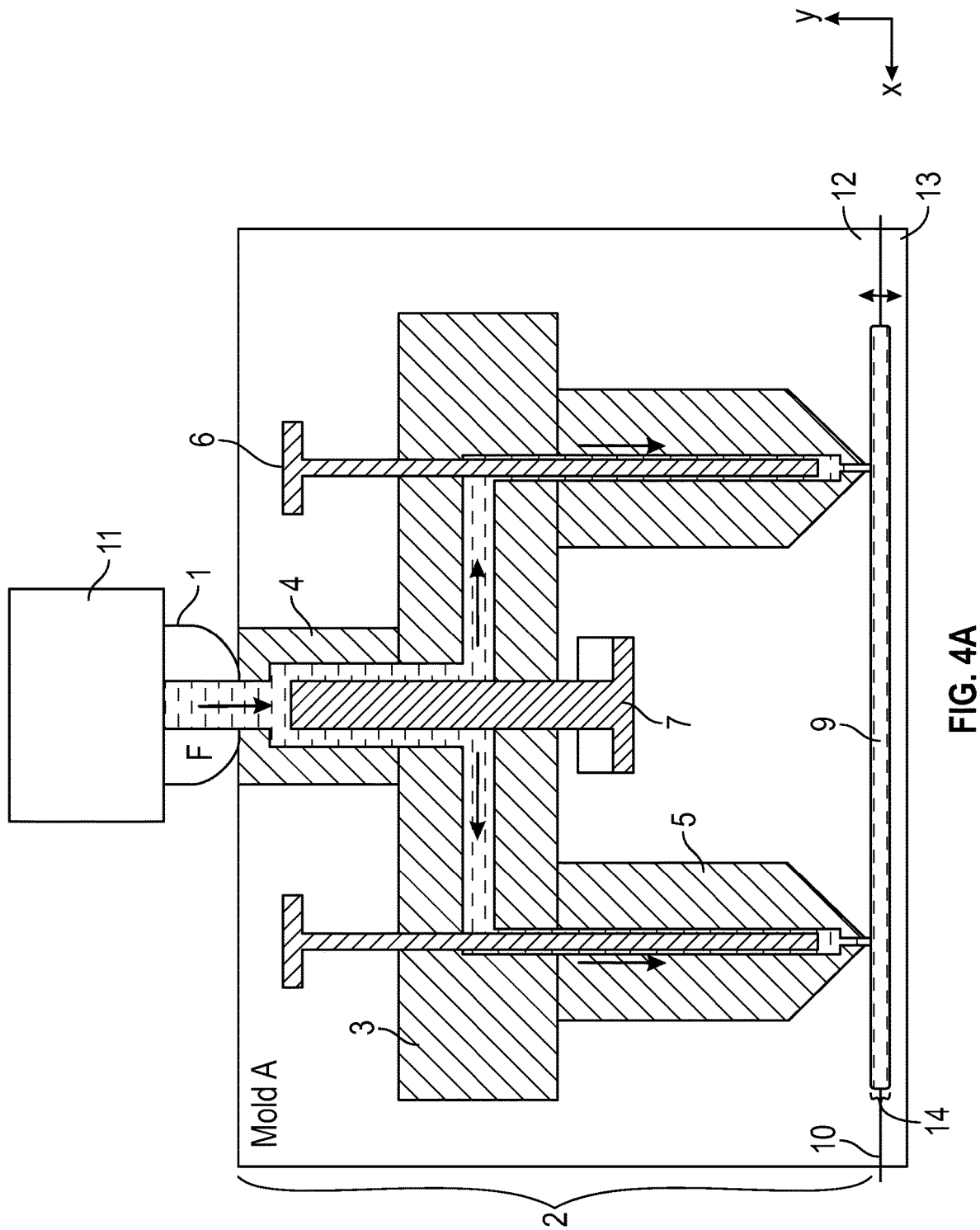
Figure 4B:
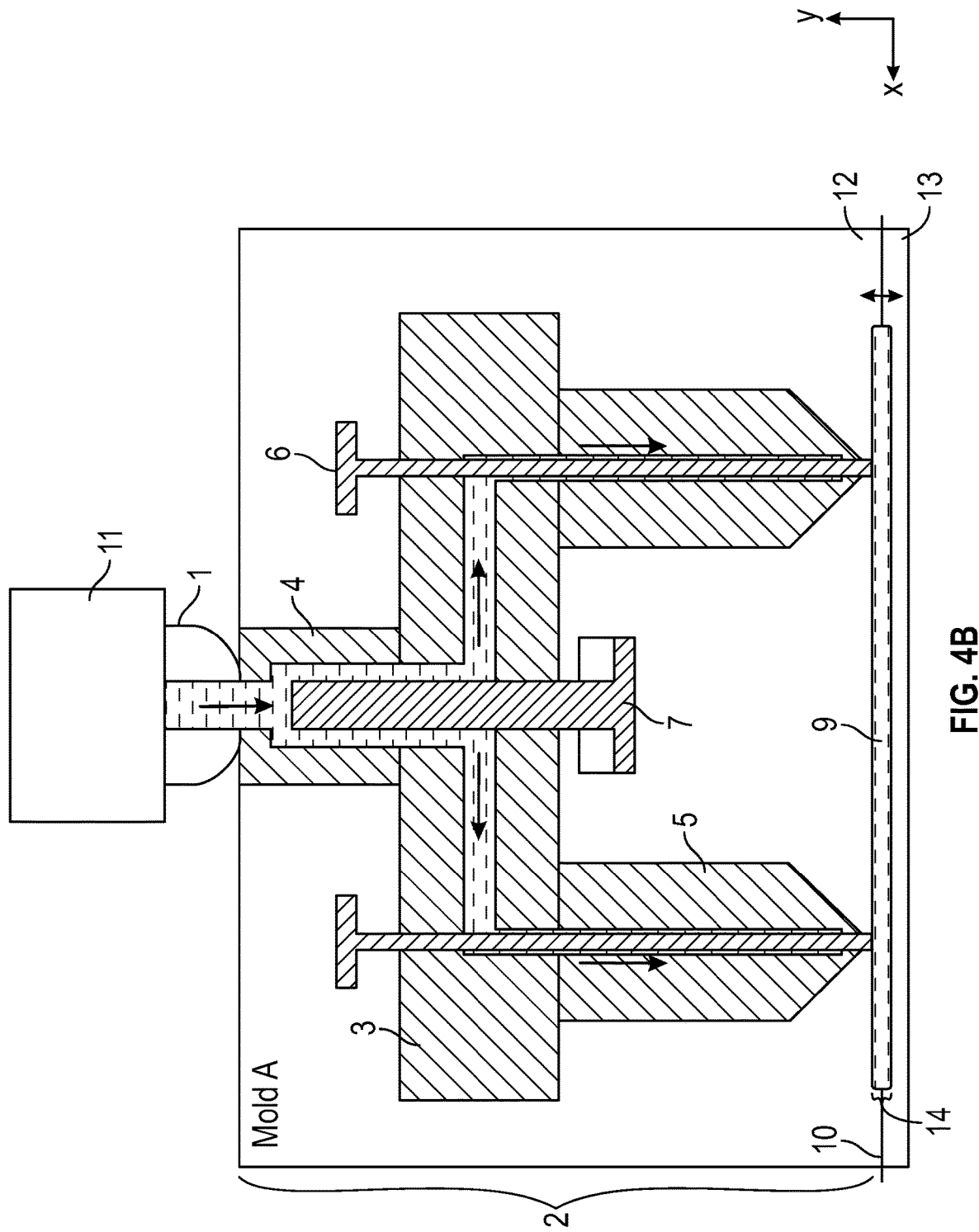

FIGS. 4A-4C, illustrate how the sprue pin 7 moves. More specifically, FIGS. 4A-4C, illustrate the order from pouring of the resin from the injection molding machine nozzle 1 into the cavity 14 of the mold until the inflow of resin stops. For description purposes, reference to the mold A will be used, but the following is applicable to the mold B.

FIG. 4A illustrates the condition during resin supply from the injection molding machine nozzle 1 to the hot runner 2 and the mold A. Applying pressure from the injection molding machine nozzle 1 to make the resin flow results in resin flowing into the cavity 14 of the mold A. This is because, inside the resin flow path of the hot runner 2, resin flows from the direction of high resin pressure to the direction of low resin pressure, as illustrated by resin direction F.

FIG. 4B illustrates the condition where the resin supply from the machine molding nozzle 1 stops, and the valve pin 6 closes the flow into the cavity 14. The valve pin 6 is a pin to prevent the leaking of resin from the hot runner nozzle 5, and has a high resistance to wear. The valve pin 6 passes through the hot runner nozzle 5 and a portion of the manifold 3. Since the valve pin 6 moves perpendicular to the mold parting line 10, the valve pin 6 receives pressure associated with the resin inside the hot runner nozzle 5 moving to the mold side, where the pressure is lower, and it becomes possible to more securely close off the hot runner nozzle 5 with the valve pin 6.

After resin flows into the cavity 14, which as previously described, is the empty space located between molds and the cavity 14 is filled, the flow of resin from the hot runner 2 stops. The flow of resin into the cavity 14 can be stopped by moving the valve pin 6, which is attached to the hot runner 2, in the direction of the resin flow from the hot runner 2 into the cavity 14. The timing of stopping the flow of resin can be determined based on a pre-determined time. The injection location or amount of the resin can also be determined. The temperature of the resin flowing is typically between 170 and 400 degrees F., but the temperature can vary depending on the shape of the molded part. The resin flowing speed can also differ depending on the resin's melt viscosity, etc. After the resin flow has stopped, cooling of the resin molded part 9 begins.

The movement of the valve pin 6 can be based on receipt of a signal from the injection molding machine 200 or receipt of a signal external to the injection molding machine 200. The drive of the movement of the valve pin 6 is performed with air. Moving the valve pin 6 occurs by applying pressure to the pressure receiving area attached to the top part of the valve pin 6. The driving configuration for moving the valve pin 6 is described in detail below.

The resin pressure occurring in the injection molding machine nozzle 1, the hot runner 2, and the cavity 14 during resin injection is as follows: the injection molding machine nozzle 1>the hot runner 2>the cavity 14. Loss of pressure can occur due to friction between the resin and the flow path.

When the valve pin 6 stops the resin flow, the pressure of the injection molding machine nozzle 1, the hot runner 2, and the cavity 14 is as follows: (the injection molding machine nozzle 1=the hot runner 2)>the cavity 14.

FIG. 4C illustrates the condition where the sprue pin 7 moves to the injection molding machine nozzle 1 side and the resin is prevented from leaking out from the sprue 4 side of the hot runner 2. The sprue pin 7 can close off the entrance of the sprue 4, and is positioned to move in the sprue 4 and the manifold 3. As described-above with respect to the valve pin 6, the sprue pin 7 can generate a stronger seal of the exit of the sprue 4 due to the strength with which the resin is attempting to leak outside the hot runner 2 where the pressure is lower. The driving configuration for moving the sprue pin 7 is described in detail below.

By moving the sprue pin 7, which is attached to the hot runner 2 in the direction of the injection molding machine nozzle 1, the resin present inside the hot runner 2 can be prevented from reverse flowing outside the hot runner 2. When resin leaks outside the hot runner 2, air enters the hot runner 2, and there is a possibility that the molded resin part 9 including air will be formed due to resin that includes air entering the cavity 14. It is possible to prevent mixing of air into the molded part by preventing the flow out of resin with the sprue pin 7.

As previously described, the possibility exists that a scant amount of resin, equivalent to the move amount of the sprue pin 7 from the condition illustrated in FIG. 4B to the condition illustrated in FIG. 4C, will be pushed out of the hot runner 2. After the sprue pin 7 has moved, it is possible to prevent additional resin leaking from the injection molding machine 200 by conducting a pull-back (suck-back) that attempts to draw the resin inside the injection molding machine nozzle 1 into the hot runner 2. The entrance on the sprue 4 side where the resin enters from the injection molding machine nozzle 1 is sealed off by the sprue pin 7, while the hot runner nozzle 5 is sealed off by the valve pin 6. This enables maintaining the pressure inside the hot runner 2 at a constant condition.

The timing of the sealing off of the valve pin 6 illustrated in FIG. 4B and the timing of the sealing off of the sprue pin 7 illustrated in FIG. 4C can also be reversed or occur simultaneously.

The pressure of the resin in the injection molding machine nozzle 1, the hot runner 2, and the cavity 14, when the inside of the hot runner 2 is sealed off (FIG. 4C) with the valve pin 6 and the sprue pin 7 is as follows: the hot runner 2>the injection molding machine nozzle 1≥the cavity 14. The pressure of the injection molding machine nozzle 1 becomes less than that of the hot runner 2 because the pressure decreases by performing a pull-back. The applied pressure from the hot runner 2 inside of the cavity 14 is eliminated, and the pressure lowers even further when the resin starts hardening.

Figure 17:
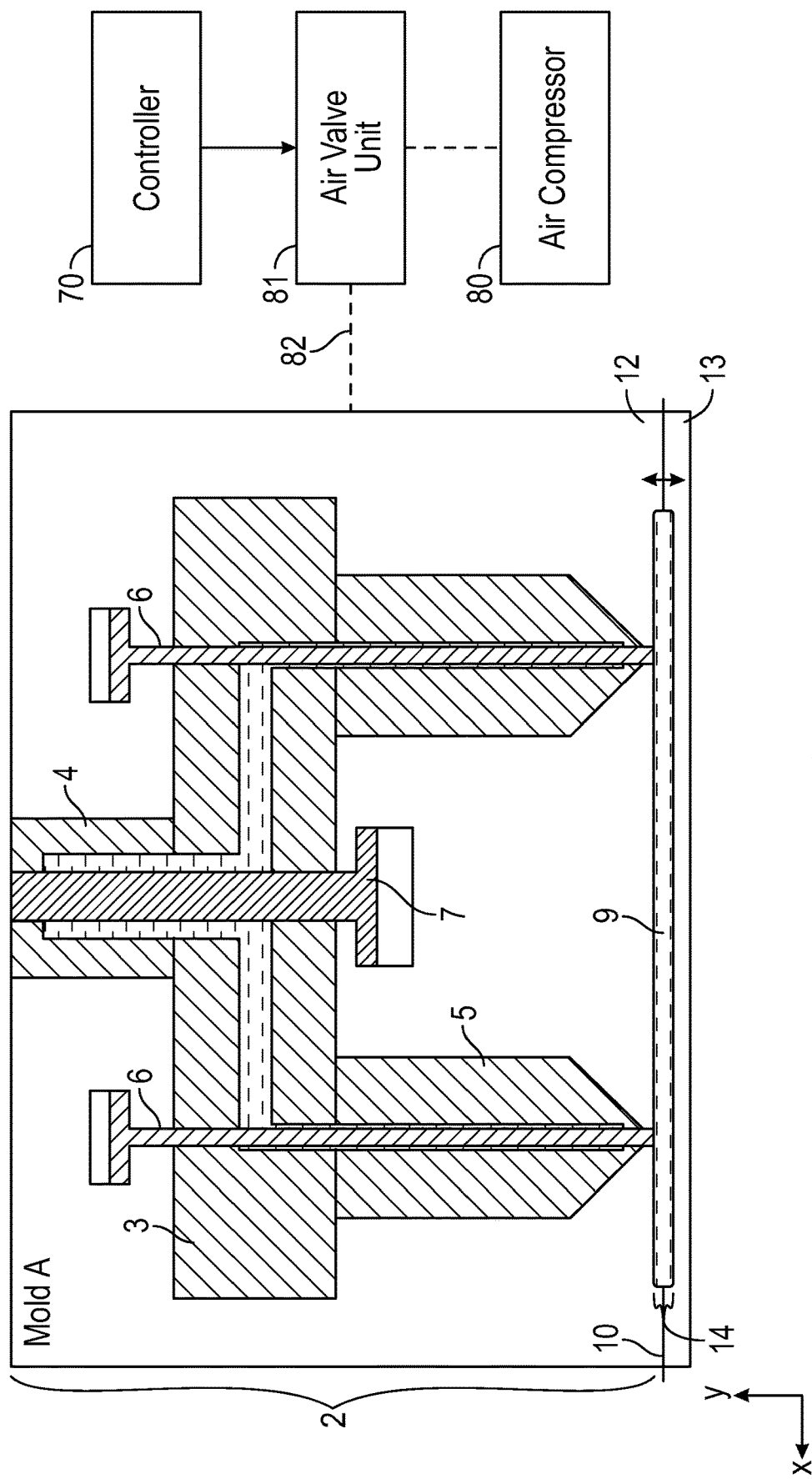
FIG. 17 illustrates a driving configuration for moving a valve pin and a sprue pin.

FIG. 17 illustrates an overview of the driving configuration for moving valve pin 6, valve pin 6 and the sprue pin 7. The injection molding system includes a controller 70, an air compressor 80, an air valve unit 81, and an air pipe 82. The air valve unit 81 is located between the air compressor 80 and the air pipe unit 82. The air compressor 80 generates compressed air for moving the valve pin 6, valve pin 6 and the sprue pin 7. The air pipe 82 includes a plurality of air pipes, while the air valve unit 81 includes a plurality of air valves corresponding to the plurality of air pipes. The controller 70 controls the air valve unit 81 (i.e., each of the plurality of air valves) regardless of whether the compressed air generated by the air compressor 80 is supplied to each of the air pipes of the air pipe 82.

Figure 18A:
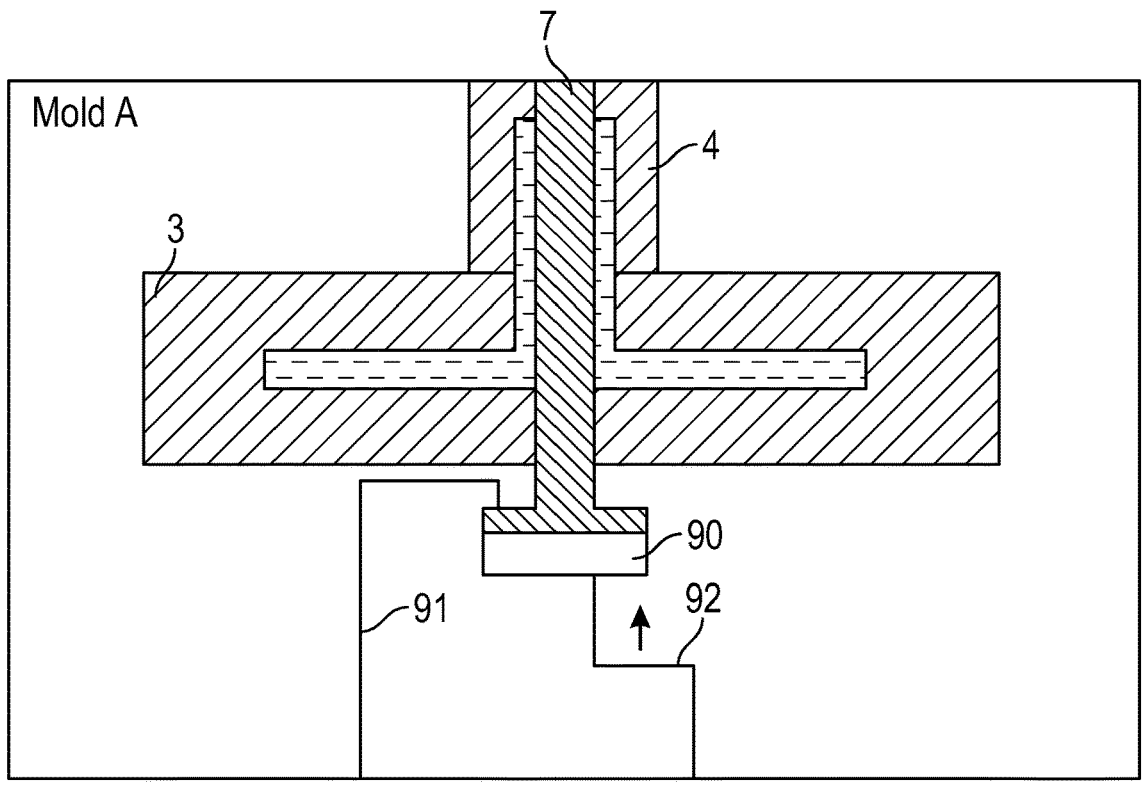
FIGS. 18A-18B illustrate a driving configuration for moving a sprue pin.
Figure 18B:
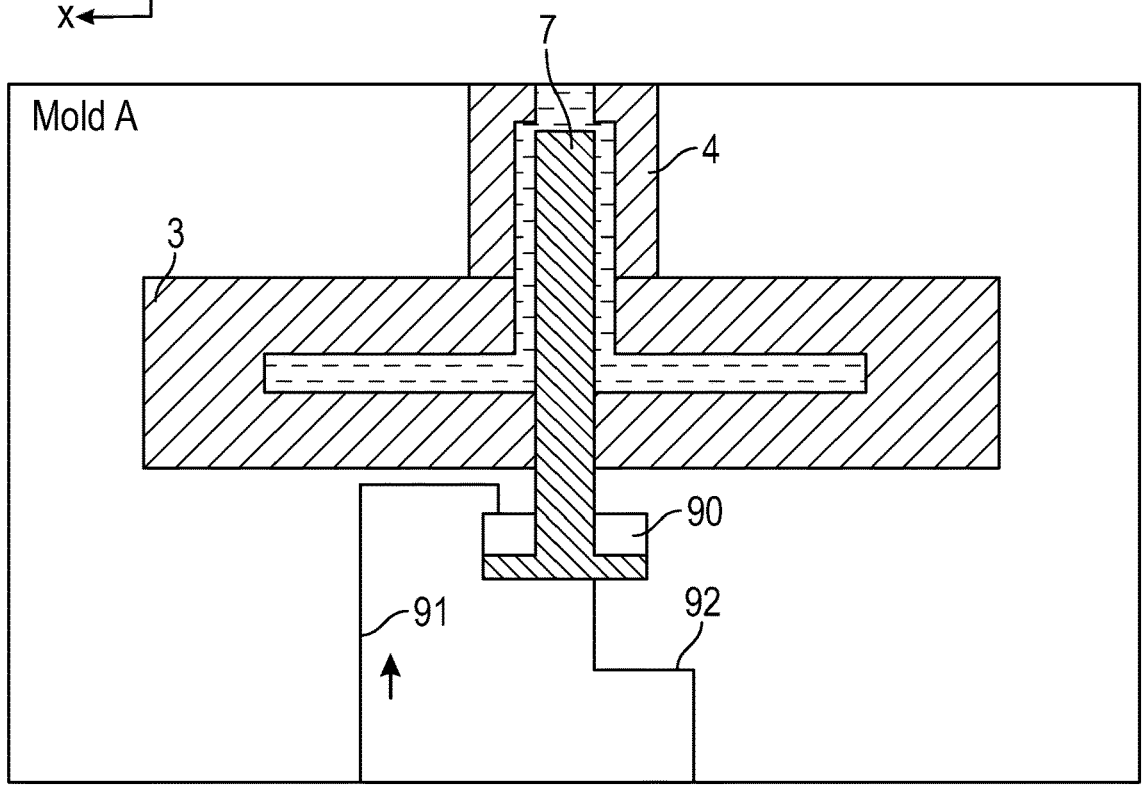

FIGS. 18A-18B illustrate the driving configuration for moving the sprue pin 7. In FIGS. 18A-18B, members other than the manifold 3, the sprue 4, and the sprue pin 7, are omitted to simplify the description. Air pipes 91 and 92 are installed in the mold A. The air pipe 91 is connected to one side of a space 90 and the air pipe 92 is connected to the other side of the space 90. The space 90 is the space where the sprue pin 7 moves. The air pipes 91 and 92 are connected with a part of the plurality of the air pipes (air pipe unit 82) at exits of the mold A. The same type of air pipes are also installed in the mold B.

In FIG. 18A, the controller 70 controls the air valve unit 81 so that air is supplied through the air pipe 92, but not supplied through the air pipe 91. In this case, as illustrated in FIG. 18A, the sprue pin 7 moves to close the entrance of the sprue 4. In FIG. 18B, the controller 70 controls the air valve unit 81 so that air is supplied through the air pipe 91, but not supplied through the air pipe 92. In this case, as illustrated in FIG. 18B, the sprue pin 7 moves to open the entrance of the sprue 4.

Figure 19A:
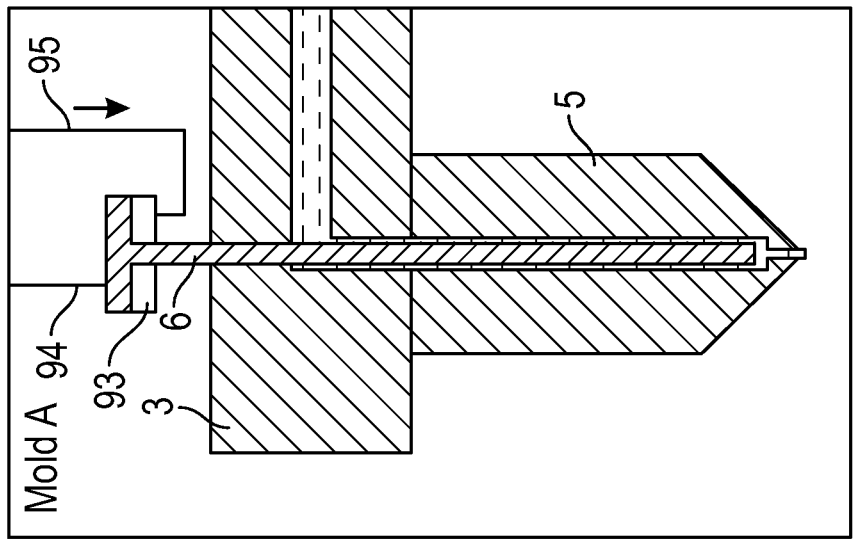
FIGS. 19A-19B illustrate a driving configuration for moving a valve pin.
Figure 19B:
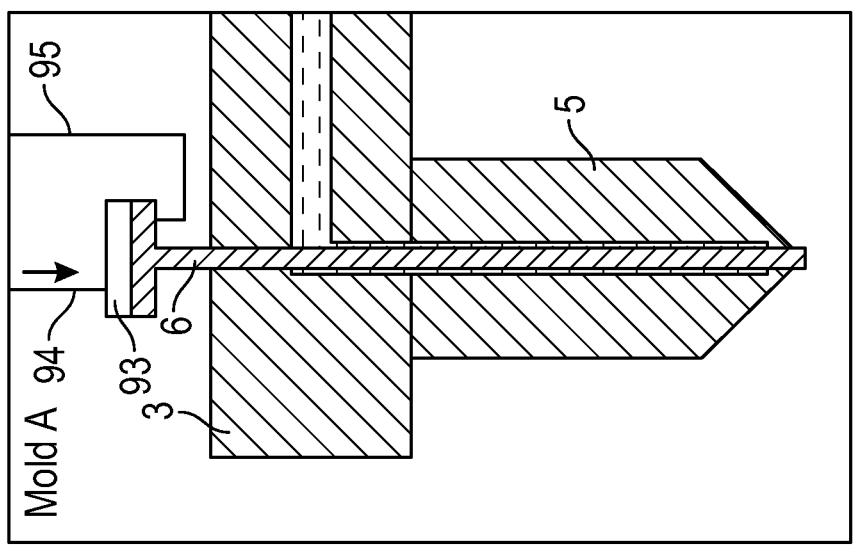

FIGS. 19A-19B illustrate the driving configuration for moving the valve pin 6. In FIGS. 19A-19B, members other than the manifold 3, the hot runner nozzle 5 the valve pin 6, are omitted to simplify the description. Air pipes 94 and 95 are installed in the mold A. The air pipe 94 is connected to one side of a space 93 and the air pipe 95 is connected to the other side of the space 93. The space 93 is the space where the valve pin 6 moves. The air pipes 94 and 95 are connected with a part of the plurality of the air pipes (air pipe unit 82) at exits of the mold A. The same type of air pipes are also installed in the mold B.

In FIG. 19A, the controller 70 controls the air valve unit 81 so that air is supplied through the air pipe 94, but not supplied through the air pipe 95. In this case, as illustrated in FIG. 19A, the valve pin 6 moves to close the exit of the hot runner nozzle 5. In FIG. 19B, the controller 70 controls the air valve unit 81 so that air is supplied through the air pipe 95, but not supplied through the air pipe 94. In this case, as illustrated in FIG. 19B, the valve pin 6 moves to open the exit of the hot runner nozzle 5. While FIGS. 19A-19B illustrate the driving configuration for moving the valve pin 6, the same driving configuration is applicable for moving the valve pin 6.

As described above, the injection molding system includes an actuator for moving the valve and sprue pins. The actuator enables moving the sprue pin 7 before the injection molding machine nozzle 1 separates from the hot runner 2. Thus, the injection molding machine nozzle 1 can pull-back the resin that is pushed out of the hot runner 2 by the movement of the sprue pin 7.

The driving configurations for moving the valve and sprue pins is not limited to above-described methods. In another exemplary embodiment, the valve and sprue pins can be moved using a servo motor or a hydraulic system.

Figure 5A:
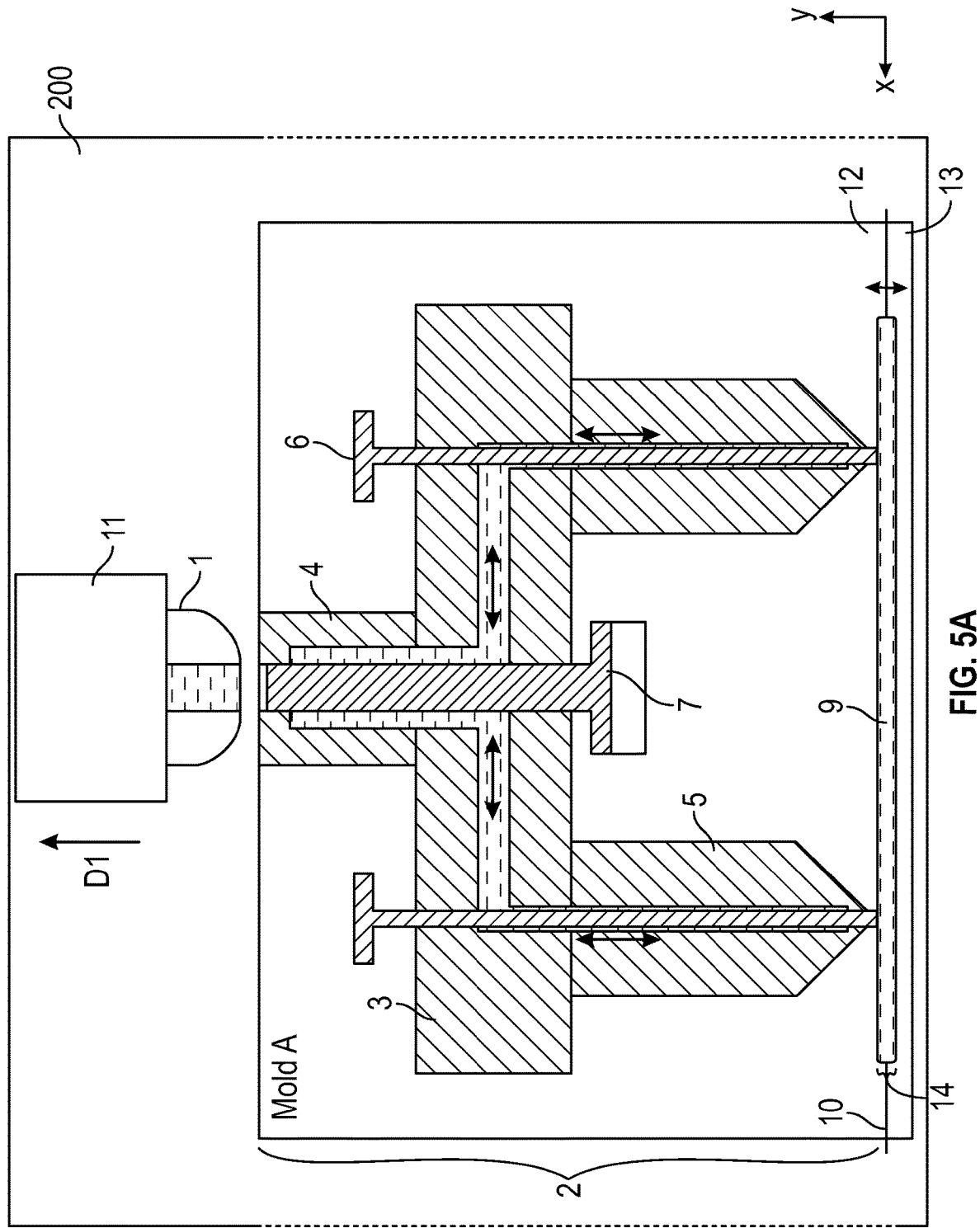

FIGS. 5A-5D illustrate the separation and connection of the injection molding machine nozzle 1 and the hot runner 2. FIGS. 5A and 5B illustrate how the injection molding machine nozzle 1 and the hot runner 2 separate, and how the separated hot runner 2 and the mold A connected to the separated hot runner 2 move outside the injection molding machine 200.

FIG. 5A illustrates the injection molding machine nozzle 1 and the hot runner 2 separating. The direction in which the injection molding machine nozzle 1 separates and moves from the hot runner 2 is in the direction indicated by the arrow D1.

FIG. 5B illustrates the direction in which the hot runner 2 and the mold A move outside the injection molding machine 200. More specifically, the hot runner 2 and mold A move in the direction of arrow D2. The direction of arrow D1 (see FIG. 5A) and the direction of arrow D2 are perpendicular to each other. The direction in which the hot runner 2 and the mold A move and the direction in which the hot runner 2 and the mold B move outside the injection molding machine 200 differs.

More specifically, the mold A and the mold B are positioned along an axis (e.g., X-axis). If the mold A is positioned more in a plus direction of the axis than the mold B is, the movement direction outside the injection molding machine 200 becomes the plus direction for the mold A and a minus direction for the mold B. If the positional relationship between the mold A and the mold B is reversed, moving outside the injection molding machine 200 can be accomplished by moving the mold A to the minus direction and the mold B to the plus direction.

Figure 5C:
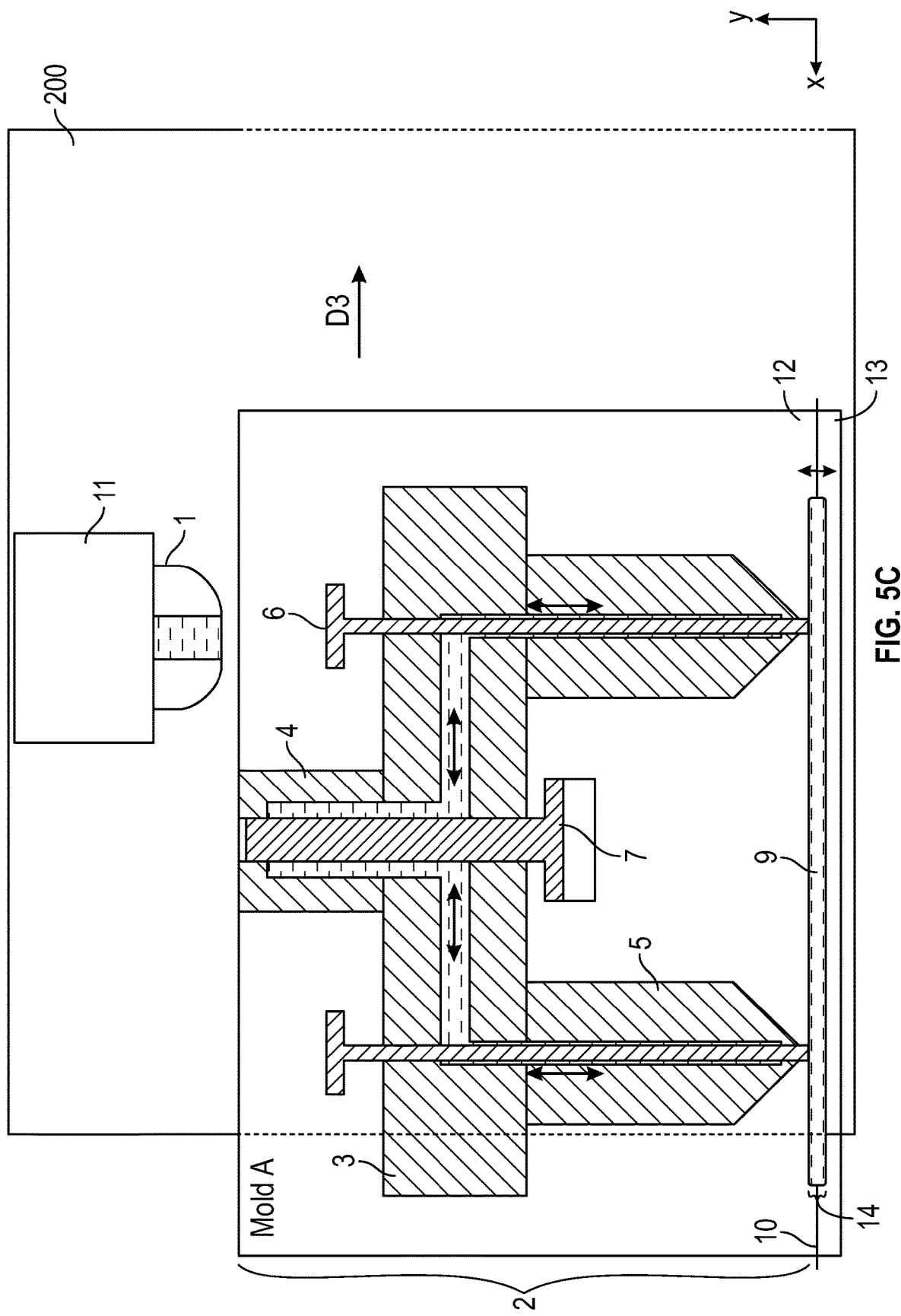
Figure 5D:
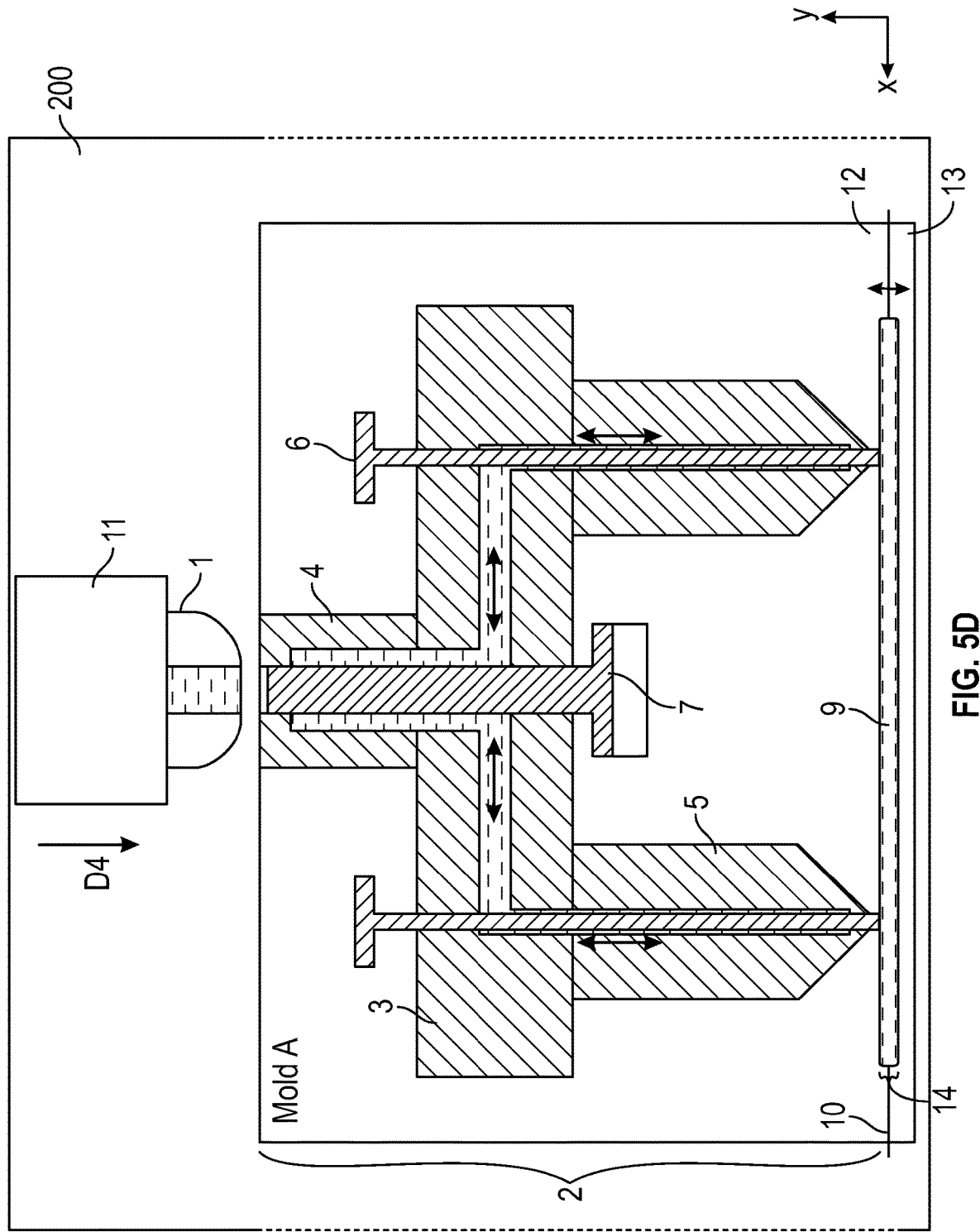

FIGS. 5C and 5D illustrate how the injection molding machine nozzle 1 and the hot runner 2 reconnect.

FIG. 5C illustrates how the mold A that was outside the injection molding machine 200 moves inside the injection molding machine 200. Since the mold A and the hot runner 2 moved in the direction of the arrow D2 when they moved outside the injection molding machine 200, they move in the direction of the arrow D3, which is in the opposite direction to the direction of the arrow D2 when re-entering the injection molding machine 200.

FIG. 5D illustrates how the injection molding machine nozzle 1 and the hot runner 2 and the mold A reconnect after the hot runner 2 and the mold A have moved into the injection molding machine nozzle 1. The injection molding machine nozzle 1 moves towards the hot runner 2 and the mold A (direction of arrow D4). After the injection molding machine nozzle 1 has moved as illustrated in FIG. 5D, the injection molding machine nozzle 1 and the sprue 4 connect as illustrated in FIG. 4C.

Figure 6A:
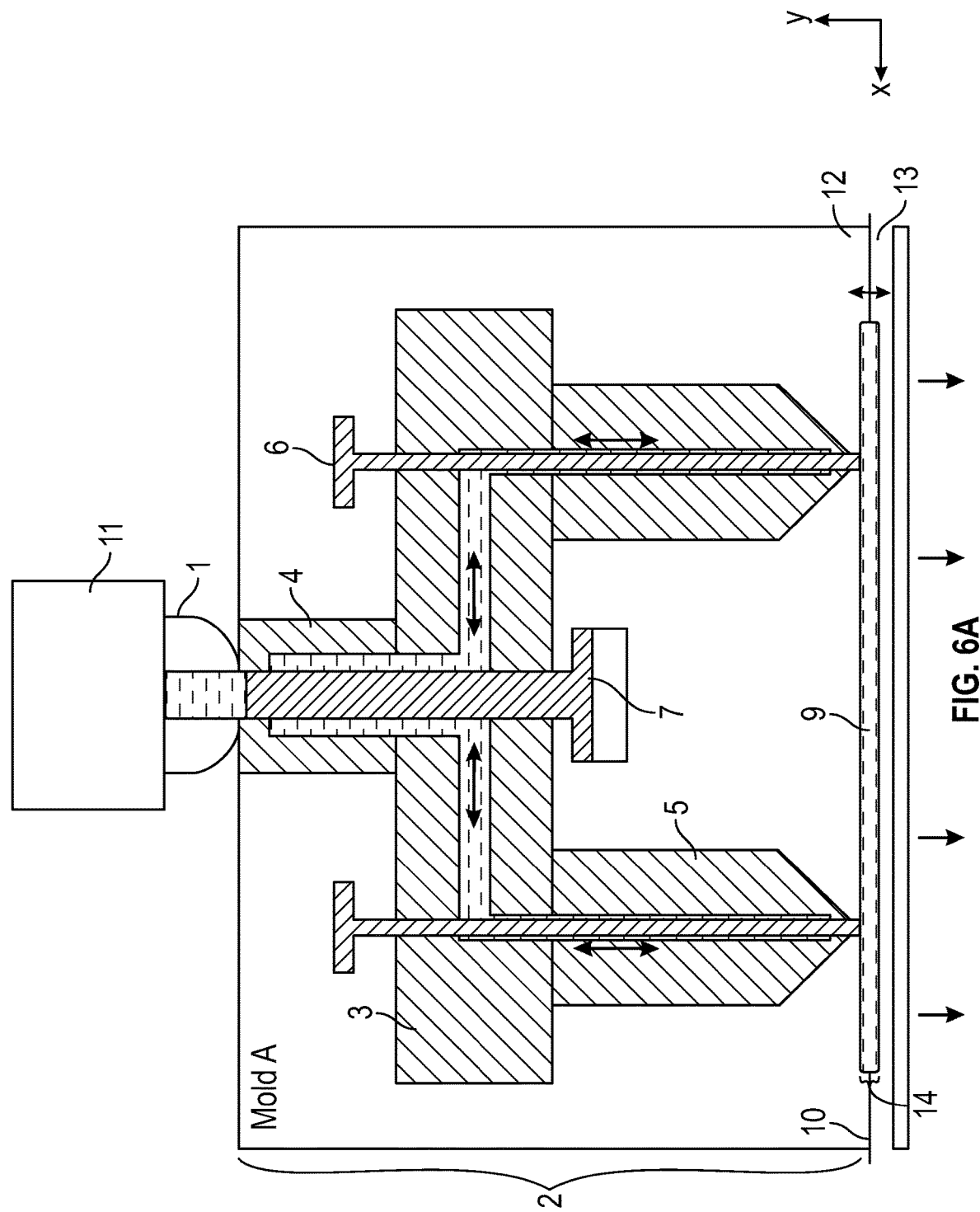
FIGS. 6A-6D illustrate part of a molding operation process.

FIG. 6A illustrates the state after the injection molding machine nozzle 1 and the hot runner 2 reconnect. After the injection molding machine nozzle 1 and the hot runner 2 have reconnected, the mold parting line 10 is opened and the resin molded part 9 removed.

Figure 6B:
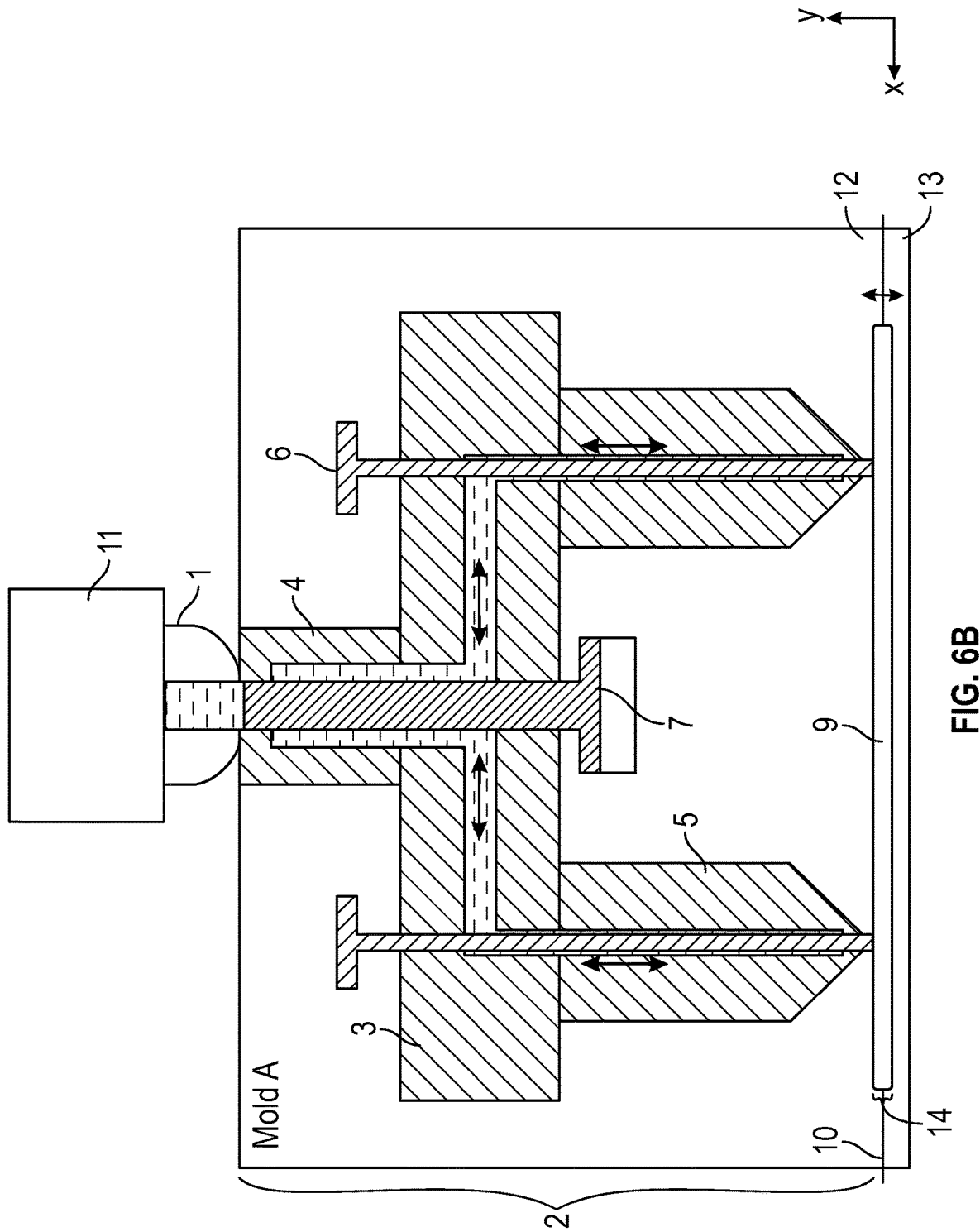

FIG. 6B illustrates the state after the mold parting line 10 is re-closed.

Figure 6C:
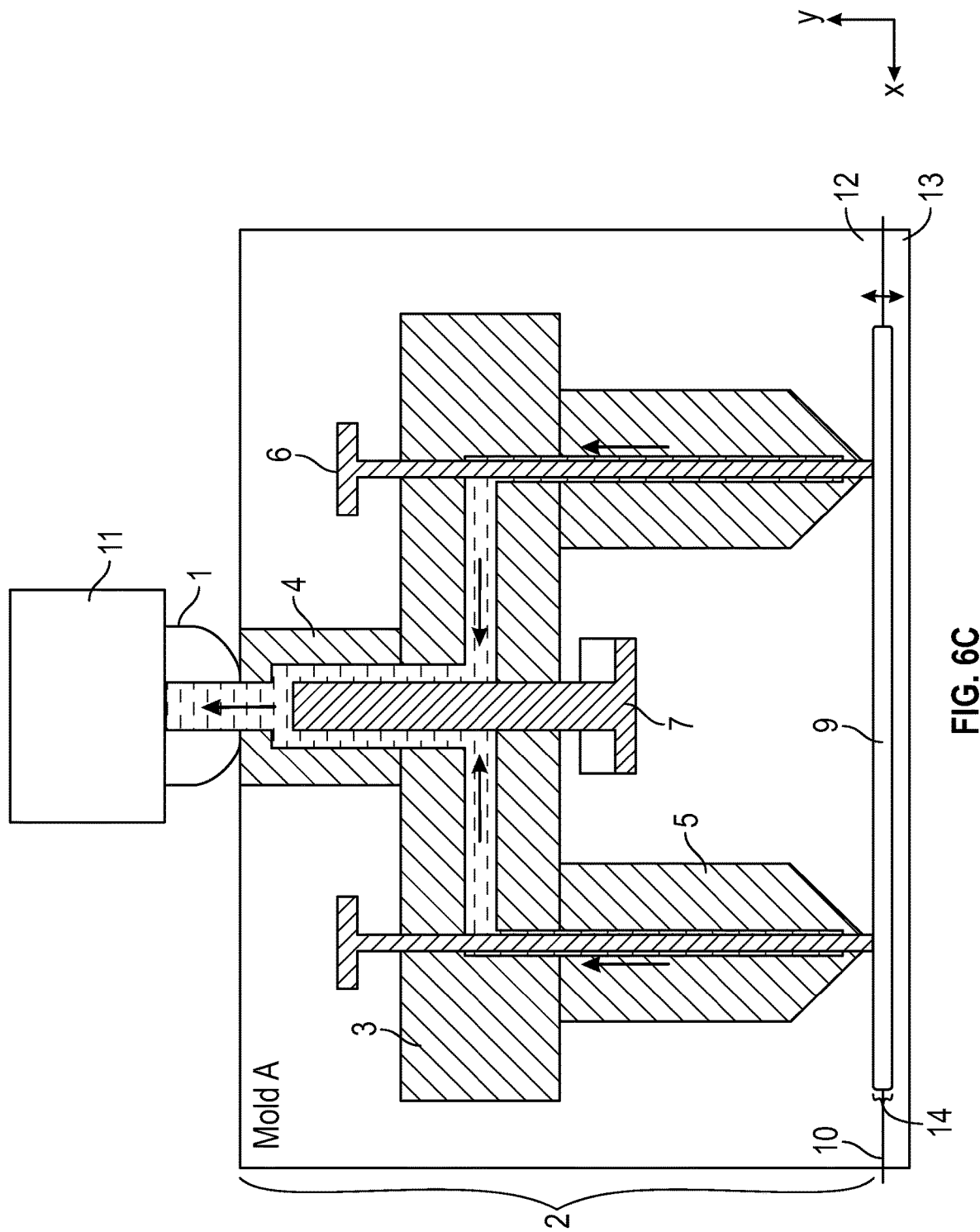

FIG. 6C illustrates the condition where the resin flow path of the sprue 4 opens by moving the sprue pin 7 in the opposite direction of the injection molding machine nozzle 1. By moving the sprue pin 7, which is attached to the hot runner 2, in the opposite direction of the injection molding machine nozzle 1, the resin that flows from the injection molding machine nozzle 1 can flow downstream.

Figure 6D:
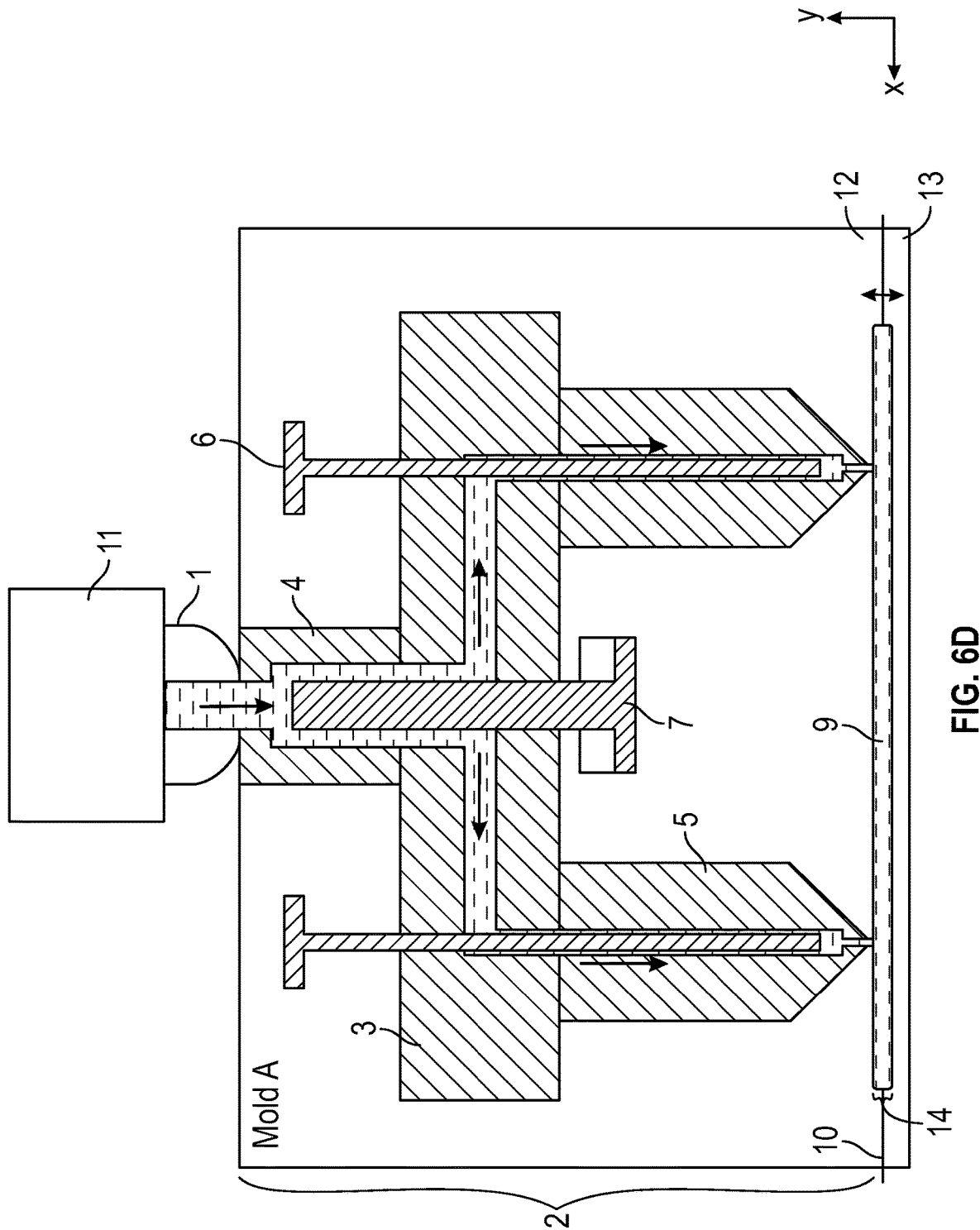

FIG. 6D illustrates opening the hot runner nozzle 5 and injecting resin into the cavity 14 by moving the valve pin 6 to the injection molding machine nozzle 1 side. The timing of the closing of the valve pin 6 illustrated in FIG. 6D and the timing of the sprue pin 7 illustrated in FIG. 6C can be reversed or performed simultaneously.

The various processes depicted in FIGS. 4A-4C, FIGS. 5A-5D, and FIGS. 6A-6D illustrate the flow of the injection molding operation.

Figure 7:
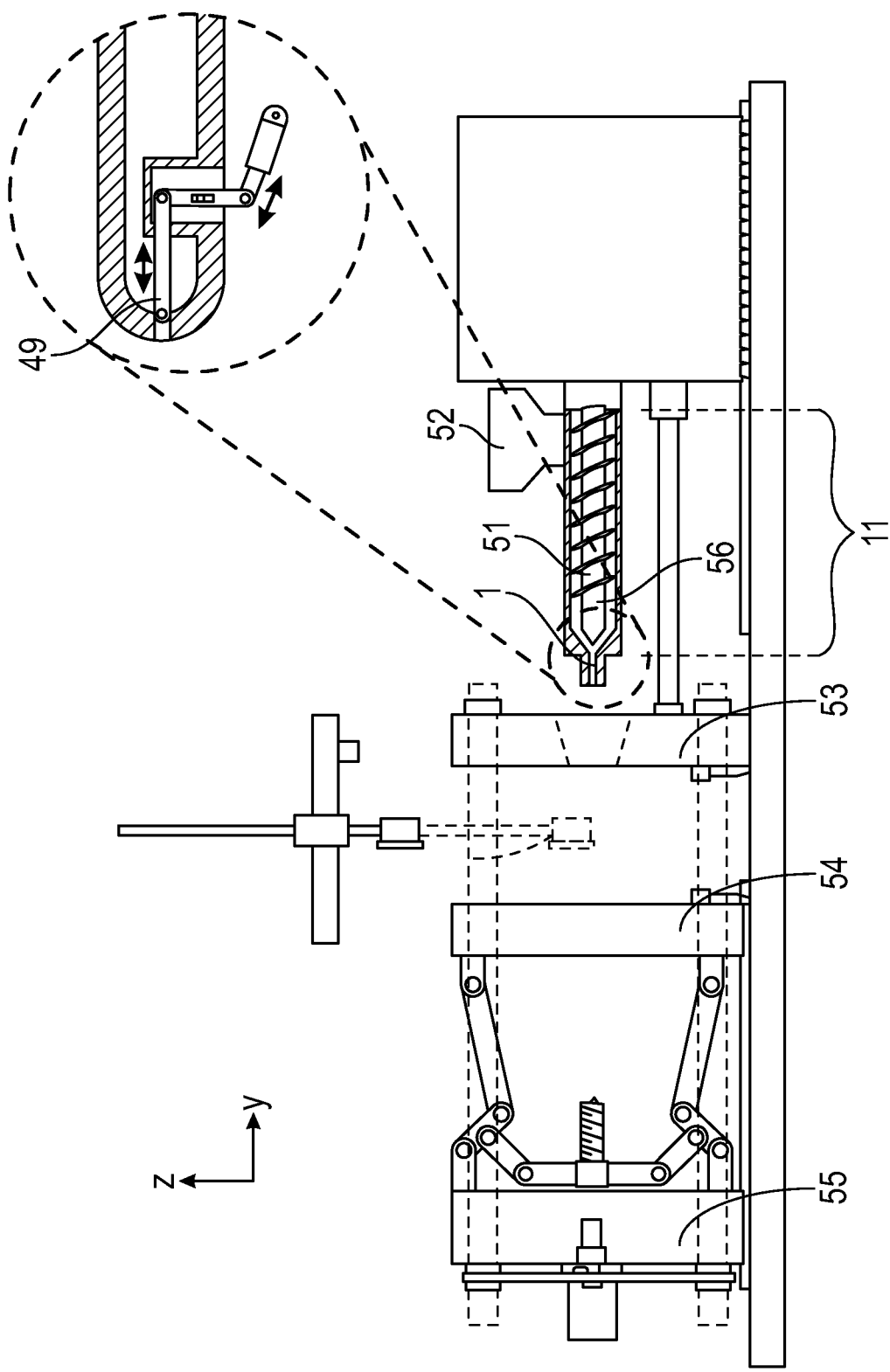
FIG. 7 illustrates a part of the injection molding machine to conduct mold closing and mold opening.

FIG. 7 illustrates a part of the injection molding machine 200 to conduct mold closing and opening.

The injection molding machine cylinder 11 consists of a screw 51, a heating barrel 56, an injection molding machine nozzle 1, and a material loading hopper 52. Resin material is sent to the injection molding machine nozzle 1 side by retracting and rotating the screw 51. Heating barrel 56 heats the resin passing through the injection molding machine nozzle 1. The gap between the screw 51 and the heating barrel 56 narrows towards the injection molding machine nozzle 1. Loading of resin to the injection molding machine cylinder 11 and the injection molding machine nozzle 1 is called resin scaling.

Resin scaling enables loading resin to the material loading hopper 52 and sending the resin to the injection molding machine nozzle 1 side by retracting and the rotating screw 51. At this time, the resin melts due to the heat generated by the heating barrel 56 and the shearing heat being applied to the resin by the screw 51 rotating when the resin is sandwiched between the screw 51 and the inner wall of the heating barrel 56. An arbitrarily determined amount of resin material is melted in the injection molding machine 200. The arbitrarily determined amount varies per mold Scaling completes at the stage when the resin has accumulated between the injection molding machine nozzle 1 and the screw 51. A shut off nozzle 49 closes off the injection molding machine nozzle 1 to ensure resin does not leak out from the injection molding machine nozzle 1.

A stationary platen 53 and a first movable platen 54 are platens to close the mold. The mold is sandwiched between the stationary platen 53 and the first movable platen 54. When viewed from the perspective of the mold, the stationary platen 53 is on the injection molding machine nozzle 1 side and does not move to the mold side. When viewed from the perspective of the mold, a second movable platen 55 is located on the opposite side of the injection molding machine nozzle 1. Moving the first movable platen 54 enables closing the stationary side mold 12 and the movable side mold 13 together with the stationary platen 53.

Even if the hot runner 2 moves along a perpendicular direction to the plane of the nozzle contact area 25 (see FIG. 2) or in a direction of movement of the injection molding machine nozzle 1, the sprue pin 7 prevents the resin from lengthening between the injection molding machine nozzle 1 and the sprue 4.

As described above, it is possible, by installing the sprue pin 7, to draw back the resin that has leaked out of the hot runner 2 during the separation of the injection molding machine nozzle 1 and reduce the possibility that the resin forms strings in the injection molding machine 200. Because the leaking of resin from the hot runner 2 is reduced, it is also possible to reduce an increase in the amount of the leaked out resin and it entering between the internal elements of the injection molding machine 200, causing clogs. More specifically, the possibility of conducting continuous molding without interruption increases. In addition, it is possible to reduce the possibility that resin molded parts that include air will be formed.

If the valve pin 6 is closed off first and then the sprue pin 7 is closed off, the resin under high pressure located in the resin flow path moves to the injection molding machine nozzle 1 before the sprue pin 7 is closed off. It is possible to prevent resin leaks from the injection molding machine 200 and the hot runner 2 by conducting a pull-back, drawing in the resin located inside the hot runner 2 into the injection molding machine nozzle 1, after closing off the sprue pin 7.

If first closing off the sprue pin 7 and then closing off the valve pin 6, the resin under high pressure located inside the resin flow path will move to the cavity 14 before closing off the valve pin 6. In this case, it is possible to securely prevent resin leaks from the hot runner 2, but the resin molded part 9 will include more resin than a predetermined amount of resin since too much of the resin under high pressure will flow into the cavity 14. Thus, precision of the molded part can deteriorate.

If the sprue pin 7 and the valve pin 6 are closed off simultaneously, it is possible to reduce the resin leaks and the deterioration of the molded part. This can be achieved because the resin under high pressure located inside the resin flow path can move to the injection molding machine nozzle 1 and the cavity 14.

In the above embodiment, moving the sprue pin 7 so that the injection molding machine nozzle 1 closes and the flow path of the resin will be smaller is described. Moving the sprue pin 7 results in reduction of a sectional area of the flow path, and/or reduction in supply of the resin to another part of the injection molding machine 200, and/or reduction in receipt of the resin from another part of the injection molding machine 200. In particular, the sectional area of the flow path of the sprue 4 is reduced, which results in less resin flowing into the sprue 4 and/or less resin leaking form the sprue 4. The sectional area of the flow path is an area of the X-Z plane in FIG. 1.

In order to reduce the amount of resin leakage, the sprue pin 7 can be used to move the boundary of the $1^{st}$ resin flow path 28 and the $2^{nd}$ resin flow path 29. If the height of the $1^{st}$ resin flow path 28 in the Y direction is small, the design of the sectional area of the tip of the sprue pin 7 can be larger than the sectional area of the $1^{st}$ resin flow path 28. In this case, the sprue pin 7 can proceed to the boundary of the 1st resin flow path 28 and the $2^{nd}$ resin flow path 29 so that the sprue pin 7 completely close off the flow path of the resin in the $2^{nd}$ resin flow path 29. The sprue pin 7 can reduce the sectional area of the flow path of resin by becoming an obstacle for the resin that passes through the sprue 4 and reaches the cavity 14.

When the injection process occurs, the sprue pin 7 is in a position where the sectional area of the flow path of the resin is larger than the sectional area of the flow path of the resin when the sprue pin 7 moves towards the injection molding machine nozzle 1. For example, a first position of the sprue pin 7 is the positon of the sprue pin 7 in FIG. 4A, while a second position of the sprue pin 7 is the position of the sprue pin 7 in FIG. 4C. The amount of resin flowing in the resin flow path decreases when the sprue pin 7 moves from the first positon to the second position. The amount of resin flowing in the resin flow path increases when the sprue pin 7 moves from the second position to the first positon.

The sprue pin 7 is at the first position from after the injection molding machine nozzle 1 contacts the sprue 4 to when injection to a mold is completed.

The structure that closes the injection molding machine nozzle 1 is not limited to the sprue pin 7. A lid to cover the entrance of the sprue 4 is applicable. The lid can slide above the entrance of the sprue 4 when the injection molding machine nozzle 1 disengages the sprue 4. The lid can slide out from the entrance of the sprue 4 when the injection molding machine nozzle 1 contacts the sprue 4.

A sprue pin that moves along the X direction in FIG. 2 also enables reduction in the flow path of resin. In this case, the sprue 4 moves along the X direction to reduce the sectional area of the $1^{st}$ resin flow path 28 or the $2^{nd}$ resin flow path 29.

The shape of the tip of the sprue 4 is not limited to a cylinder, and a cone or triangular pyramid, etc are applicable. Regardless of the shape of the sprue 4, the sprue pin 7 will be stop at some point by contacting the inside of the sprue 4.

The sprue pin 7 should keep the sprue 4 closed at least until the resin cools so that any melted resin will not leak. For example, the sprue pin 7 keeps reducing the flow path of resin until the mold is moved out of the injection molding machine 200.

The valve pin 6 and shut off nozzle 49 move in order to reduce the flow path of the resin. This means that the sectional area of the flow path in the hot runner nozzle 5 is reduced so that less resin flows into the cavity 14 and/or leaks out from the hot runner nozzle 5. The sectional area of the flow path in the injection molding machine nozzle 1 is reduced so that less resin flows into the sprue 4 and/or leaks from the injection molding machine nozzle 1.

FIGS. 1-7 illustrate mold details according to the present exemplary embodiment. An example of an operation of the injection molding system will now be provided.

First, the equipment configuration of the injection molding system of the present embodiment will be described with reference to FIGS. 9-11, while the process of the injection molding system of the present embodiment will be described with reference to FIG. 8.

Figure 9:
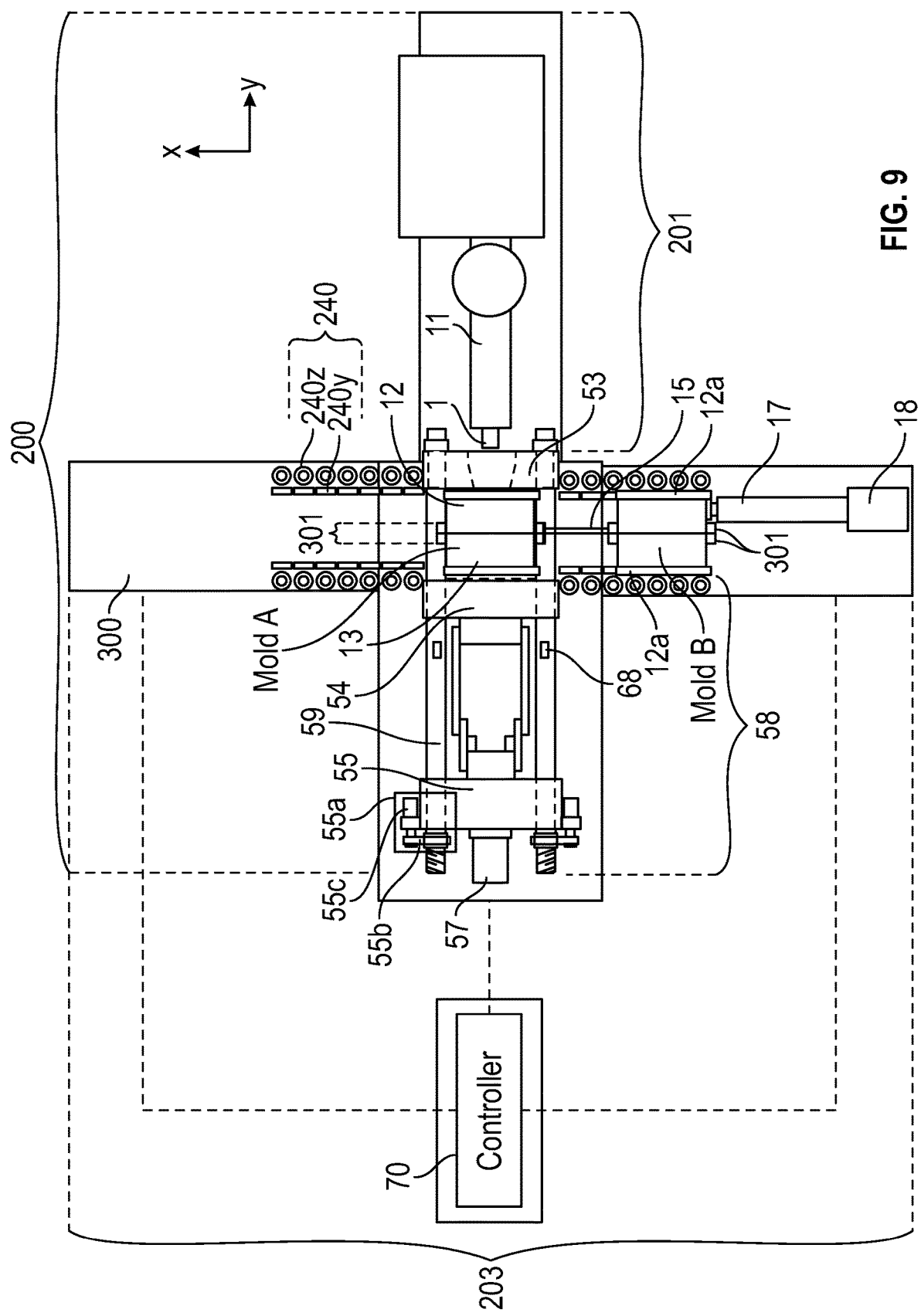
FIG. 9 illustrates a positional relation between an injection molding machine and a cart.

FIG. 9 illustrates the positional relationship between the injection molding machine 200 and the cart 300 of the present embodiment. As illustrated in FIG. 9, the injection molding machine 200 includes the injection equipment 201 consisting of the injection molding machine nozzle 1 and the injection molding machine cylinder 11, mold clamping equipment 58, and a removal device to remove a molded part. The injection equipment 201 and the mold clamping device 58 are mounted in the Y direction.

The mold clamping device 58 performs clamping, as well as opening and closing of mold A and mold B, and it is a toggle type clamping device in the present embodiment. The stationary platen 53, the first movable platen 54 and the second movable platen 55 are arranged in this order in the Y direction in the clamping device 58. Multiple tie-bars 59 (four in the present embodiment) pass through the platens 53 to 55. Each tie-bar 59 is an axis that extends in the Y direction, with one end fixed to the stationary platen 53. Each tie-bar 59 is inserted into its respective through hole formed in the first movable platen 54. The other end of each tie-bar 59 is fixed to the second movable platen 55 via adjusting mechanism 55a. The first movable platen 54 and the second movable platen 55 can move in the Y direction perpendicular to the frame 203. The stationary platen 53 is fixed to the frame 203. The frame 203 includes the frame of the cart 300, and supports an actuator 18 and multiple rollers 240.

A toggle mechanism (not illustrated) is installed between the first movable platen 54 and the second movable platen 55. The toggle mechanism causes the first movable platen 54 to move forward/backward in the Y direction in relation to the second movable platen 55, i.e., in relation to the stationary platen 53.

The injection molding machine 200 includes sensors (not illustrated) for measuring clamping force. In the present embodiment, each sensor is a strain gauge installed on a tie-bar 59, and calculates the clamping force by detecting the distortion of the tie-bar 59.

An adjusting mechanism 55a is supported with a nut 55b so it can freely rotate on the second movable platen 55, with a motor 55c as the driving source, and a transfer mechanism (a belt transmission mechanism in the present embodiment) to transfer the driving force of the motor 55c to the nut 55b. Each tie-bar 59 passes through a hole formed in the second movable platen 55, and engages with a nut 55b. The engagement positions in the Y direction change between the nut 55b and the tie-bar 59 by causing the nut 55b to rotate. In other words, the position at which the second movable platen 55 is fixed in relation to the tie-bar 59 changes. Thus, the space between the second movable platen 55 and the stationary platen 53 can change, making it possible to adjust the clamping force, etc. Each amount of rotation of the motor 55c is detected by a sensor (not illustrated), such as a rotary encoder. By driving the motor 55c while detecting the amount of rotation of the motor 55c, it is possible to change the position at which the second movable platen 55 is fixed in relation to the tie-bar 59 at a higher precision with a position arbitrary to the initial position.

A mold is injected from the injection molding machine 200 by moving to an area (a molding operation position) between the stationary platen 53 and the first movable platen 54. Mold A or mold B brought into the area is sandwiched between the stationary platen 53, the first movable platen 54, and the second movable platen 55, and is clamped. Opening and closing is performed based on the movement of the movable mold 13 via movement of the first movable platen 54.

Molds A and B are a pair belonging to the stationary mold 12 and the movable mold 13, which are opened/closed in relation to the stationary mold 12. The molded part is molded by injecting a molten resin into a cavity formed between the stationary mold 12 and the movable mold 13. Clamping plates 12a and 13a are respectively fixed to the stationary mold 12 and the movable mold 13. The clamping plates 12a and 13a are used to lock molds A and B in the area between the stationary platen 53 and the first movable platen 54 (mold clamping position) of the injection molding machine 200.

A self-closing unit 301 to maintain a closed condition between the stationary mold 12 and the movable mold 13 is mounted for molds A and B. The self-closing unit 301 enables preventing molds A and B from opening after molds A and B are unloaded from the injection molding machine 200. In the present embodiment, the self-closing unit 301 keeps molds A and B in a closed state using a magnetic force. The self-closing unit 301 is installed at multiple locations along opposing surfaces of the stationary mold 12 and the movable mold 13. The self-closing unit 301, in the present embodiment, is a combination of an element on the side of the stationary mold 12, and an element on the side of the movable mold 13. The combination of these elements is a combination of magnetic materials, such as a permanent magnet and iron, for example, or a pair of permanent magnets.

In another exemplary embodiment, a mechanism using elastic deformation, such as a plastic, or a mechanical type mechanism, made from a metal and a spring can be used for the self closing unit 301. Using a magnetic force is advantageous because it enables reverting to the closed state when the mold is slightly opened. For some self-closing units, the closing force is generally small in relation to the clamping force of a clamping device, which results in the mold slightly opening due to the resin pressure inside the mold. A self-closing unit using a magnetic force enables reclosing the mold in conjunction with a reduction of the resin pressure in the mold, even if the mold slightly opens. At this time, a state of adherence between the mold and the resin in the mold is maintained, stabilizing the quality of the molded part.

For the self-closing unit 301, two pairs or more, four pairs being advantageous, can be installed for one of the molds (A and B). A pair of self-closing units can leave a space between approximately 0.1 mm and several mms open when molds A and B are in a closed state. This enables preventing a sudden change in magnetic force when transitioning from the open state to the closed state, and thus, it is possible to maintain a balanced closed state.

An actuator 18, which is the driving source to move molds A and B, a link 17 between the actuator and mold B, a link 15 between mold B and mold A, and a roller 240 are mounted on the cart 300. There is only one actuator 18 installed on the mold B side. Two molds can be moved with the actuator 18 via the link 15. The roller 240 is installed along the X axis, enabling molds A and B to enter and exit the injection molding machine 200. Multiple rollers 240 form two rows, and each separates in the Y direction.

Rollers 240 include two types rollers, the rollers 240Z and the rollers 240Y, which rotate on two different axes. The rollers 240Z rotates around an axis in the Z direction and the rollers 240Y rotates around an axis in the Y direction. The rollers 240Z guides movement in the X direction of molds A and B, contacting the side surfaces of molds A and B (side surfaces of the clamping plates 12a and 13a) and supporting molds A and B from the side. The rollers 240Y guide movement in the X direction of molds A and B contacting the bottom surfaces of molds A and B and supporting molds A and B from the bottom.

The controller 70 controls the injection molding machine 200, molds A and B, and the cart 300. The controller 70 includes, for example, a processor such as a CPU, a RAM, a ROM, a storage device such as a hard disk, and interfaces connected to sensors or actuators. The processor executes programs stored in the storage device. An example of a program (control) that the controller 70 executes is described below.

Figure 10:
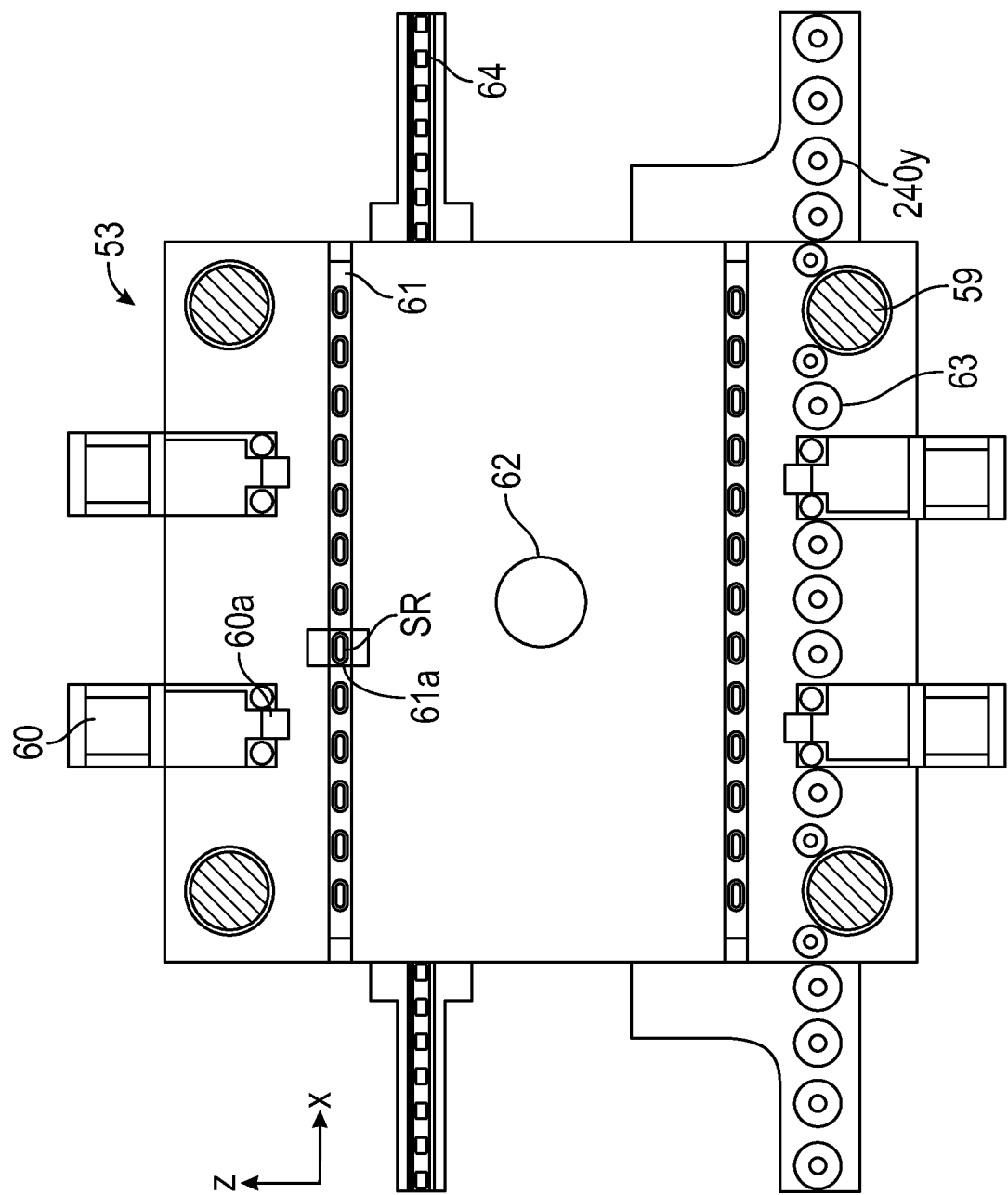
FIG. 10 illustrates a view of a stationary platen from a first movable platen's side.

FIG. 10 illustrates a view of the stationary platen 53 from the first movable platen 54's side. Open area 62, through which the injection molding machine nozzle 1 moves forward/backward, is formed in the central area of the stationary platen 53.

Inside the injection molding machine 200, no rollers are installed serially with the rollers 240Z, but a roller 63 is installed serially with the rollers 240Y. The rollers 63 and 240Y can be the same size or can be a different size. The rollers 63 are lined up outside the injection molding machine 200 and are approximately straight on the X axis that lines up with the rollers 240Y. Rollers 63 enable molds A and B to move smoothly from outside the injection molding machine 200 to inside the injection molding machine 200.

Typically when installing rollers (not illustrated) that rotate circumferentially in a direction of the Z axis approximately straight on the X axis that lines up with the rollers 240Z, a gap the size of roller 240Z is created between the stationary platen 53 and the clamping plates 12a and 13a. For that reason, when rotating in the Z axis circumference, which is installed serially with the rollers 240Z, the rollers (not illustrated) cannot be installed inside the injection molding machine 200.

There is a possibility that moving of molds A and B in the X-direction can become more difficult due to frictional force if the XZ plane of the stationary platen 53 and the XZ plane of the clamping plates 12a and 13a make contact when molds A and B move inside the injection molding machine 200, or that wear occurs due to chafing. For that reason, the inner surface of the stationary platen 53 has grooves 61 that extend in the direction of the X axis. Two rows of the grooves 61, vertically separated from each other, are provided. Each of the grooves 61 includes a roller unit 61a.

The roller unit 61a supports roller SR so that the roller SR is free to rotate. The roller SR rotates around the revolution axis in the Z direction and guide movement in the X direction of molds A and B. The roller SR contacts the outer surfaces of molds A and B (the outer surface of the clamping plates 12a and 13a) and supports molds A and B from the side. The roller unit 61a, by a bias of a spring (not illustrated), is positioned at a position where the roller SR protrude from the groove 61. Multiple instances of roller unit 61a and roller SR are used in the present embodiment.

At the time of clamping, the roller unit 61a is retracted into the groove 61, and positioned such that the roller SR does not protrude from the groove 61. The roller unit 61a can prevent the inner surfaces of the molds A and B and the stationary platen 53 from contacting and damaging the inner surfaces when alternating molds A and B. The roller unit 61a does not impede the inner surface of the stationary platen 53 and molds A and B, which are closed during clamping.

A roller supporting body 64 is mounted on both sides in the X direction of the stationary platen 53. The roller SR is supported by the roller supporting body 64. Roller supporting body 64 and roller SR enable conveying molds A and B at a higher speed and more smoothly when conveying molds A and B between inside the injection molding machine 200 and outside the injection molding machine 200.

On the stationary platen 53, multiple fixing mechanisms (hereinafter referred to as "clamp(s)") 60 are arranged to secure the stationary mold 12 to the stationary platen 53. Each clamp 60 includes an engaging portion 60a that engages with the clamping plates 12a and 13a, and a built-in actuator (not illustrated) that moves the engaging portion 60a between an engagement position and an engagement release position. The actuator is a fluid actuator, such as an oil pressure actuator, or an air actuator. In the situation where multiple molds are frequently alternated, a fluid actuator is advantageous.

In the present embodiment, an electromagnetic clamp is used. An electromagnetic clamp can magnetize and demagnetize a magnetic material inside of a coil present in the object to be clamped in a relatively short time by causing a current to flow in the coil. In the present embodiment, this enables attaching/releasing molds.

For the first movable platen 54, similar to the stationary platen 53, roller SR and clamps 60 to secure the second movable mold 55 are used.

Figure 11:
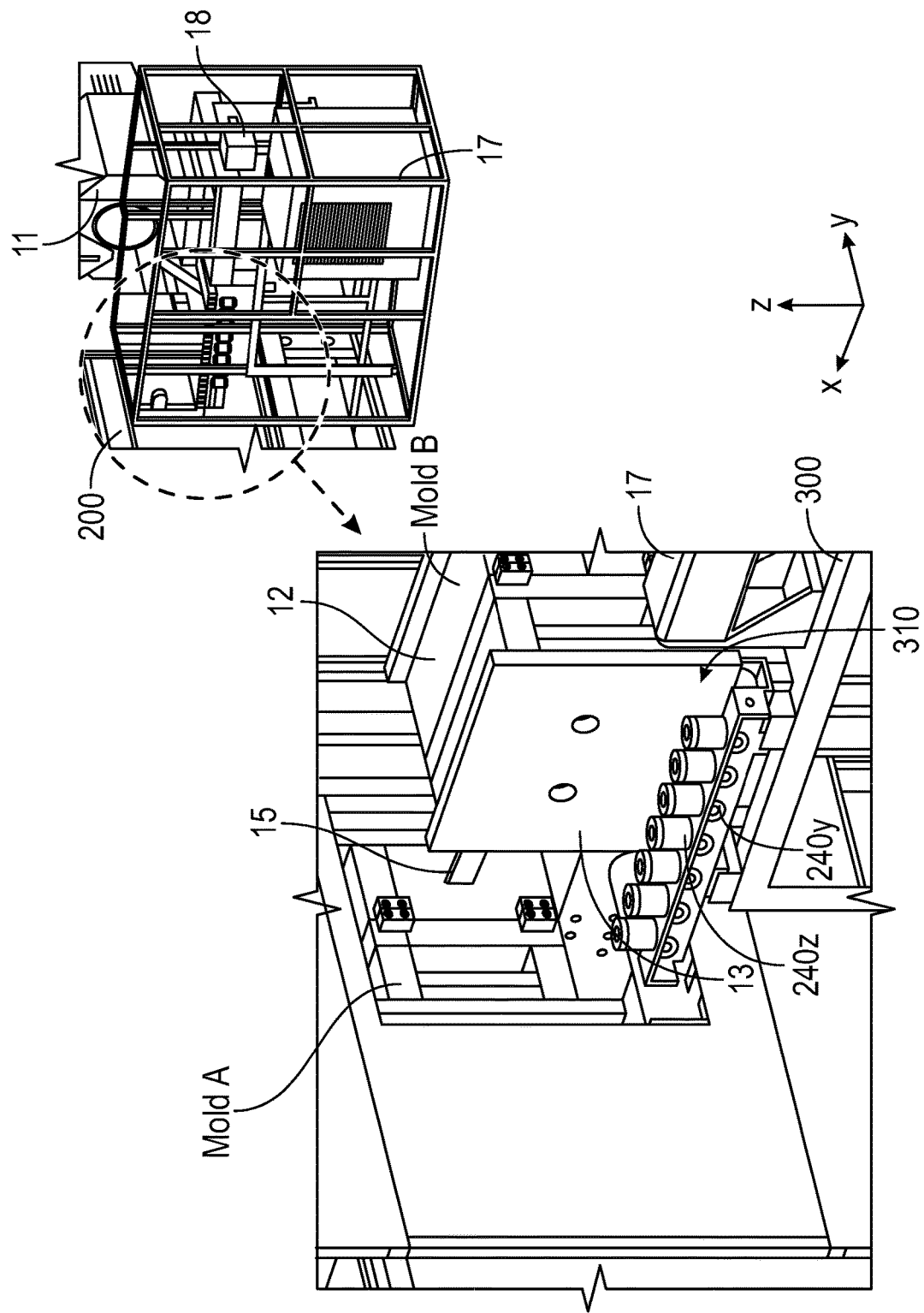
FIG. 11 illustrates a partial perspective of mold A located inside of injection molding machine and mold B located outside the injection molding machine.

FIG. 11 illustrates a partial perspective of mold A located inside the injection molding machine 200 and mold B located outside the injection molding machine 200. More specifically, FIG. 11 illustrates viewing molds A and B from the side where the second movable platen 55 (see FIG. 9) is located and from the side where the actuator 18 is located. Molds A and B can move from outside the injection molding machine 200 to inside the injection molding machine 200 based on the rotation of rollers 240Y and 240Z.

If mold B is to be exchanged, removal and installation of mold B can be done from position 310 indicated in FIG. 11. The mold B waits at position 310 on the cart 300 when it is cooled. If mold A is to be exchanged, removal and installation can be done from a position of the opposite side of the actuator 18 of the cart 300. The mold B and the actuator 18 are linked with the link 17, and the mold A and the mold B are linked with the link 15. Thus, the mold A and the mold B are moved together. The exchange position of a mold is not limited to that described above, and can be performed from above, or the exchange of both molds A and B performed on the actuator 18 side.

The molds A and B described in the present embodiment can be frequently exchanged depending on the type of molded part. In recent years, various types of molds, as well as the number of molds being manufactured at once, being manufactured in small amounts has been increasing. Therefore, manufacturing two types of molded parts with one operation of an injection molding machine system has significant merit in a manufacturing work place.

As described above, the foregoing injection molding machine system enables manufacturing to be performed while frequently exchanging various molds. To achieve this, a cooling liquid flow path is used to stream cooling liquid to cool the resin and conduits used to send electrical signals to control, among other things, the valve pin 6 and the sprue pin 7 inside molds A and B. The cooling liquid flow paths and conduits pass through the inside of molds A and B, while connected to cooling liquid supply equipment and the controller 70 (see FIG. 9) respectively, which are located outside molds A and B. In the present exemplary embodiment, the cooling liquid is water, but any liquid that would achieve the same cooling effect is applicable.

The structures for the cooling liquid flow paths and the conduits for molds A and B of the present exemplary embodiment will be described with reference to FIGS. 12A-12D, FIG. 13, FIGS. 14A-14B, and FIG. 15.

FIGS. 12A-12D and FIG. 13 illustrate the structure of the cooling liquid flow paths for molds A and B.

Figure 12A:
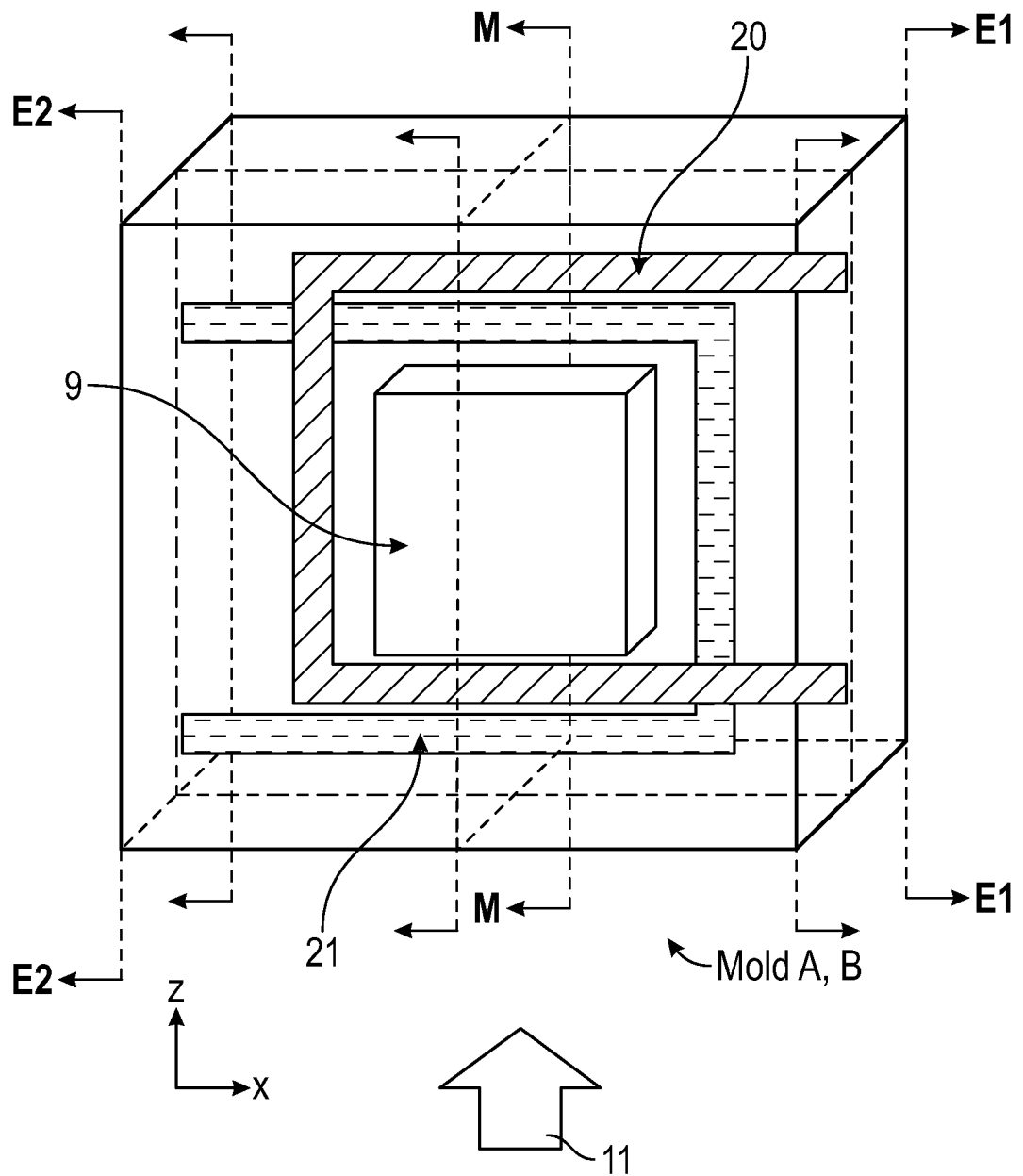
FIGS. 12A-12D illustrate cooling liquid flow paths inside molds.
Figure 12B:
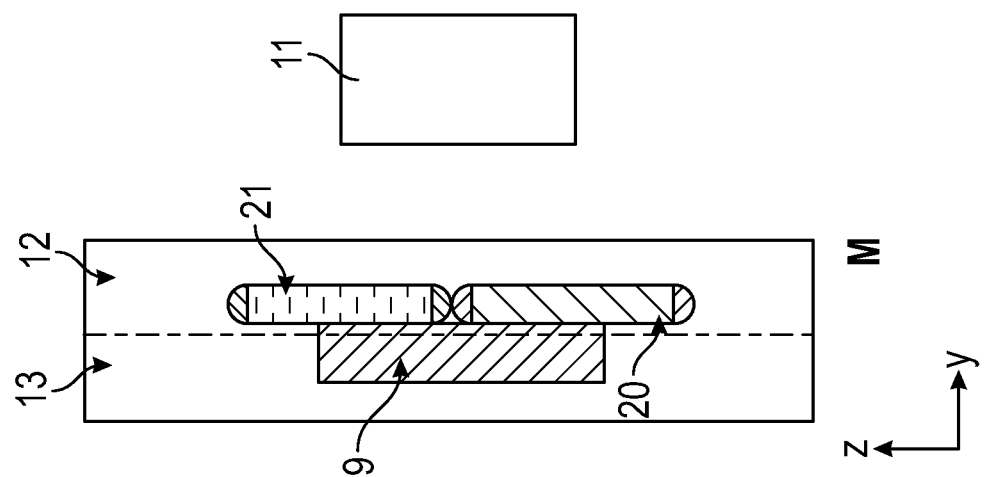
Figure 12C:
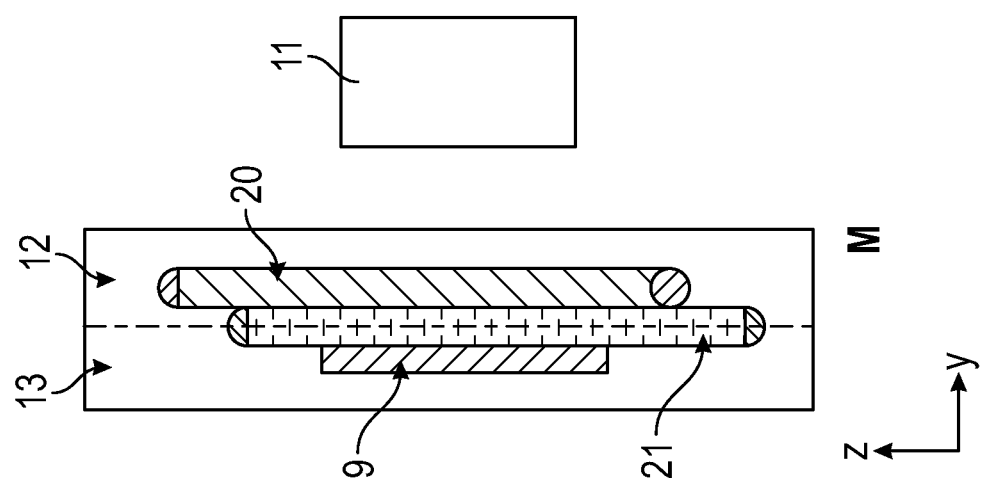
Figure 12D:
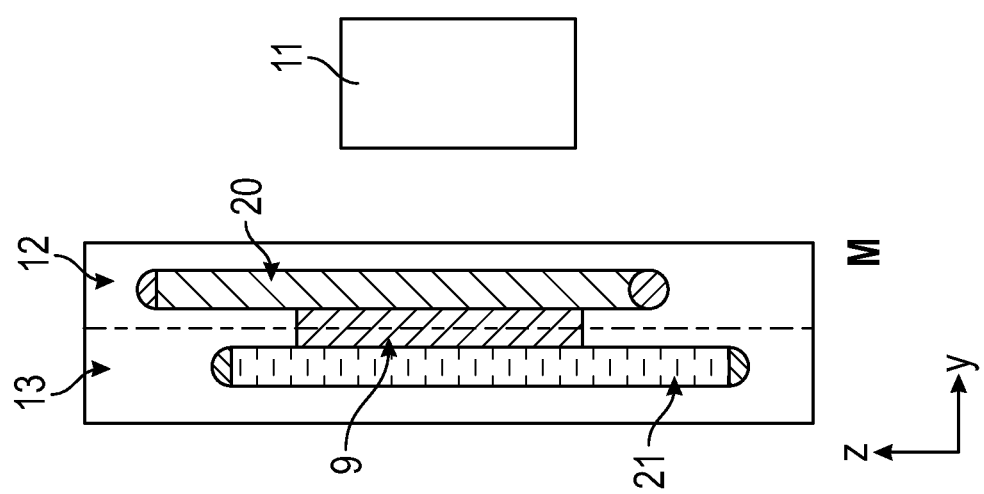

FIG. 12A illustrates a perspective view of mold A or B. A cross section M is parallel to YZ plane. FIGS. 12B-12D illustrate views of mold A or mold B from the cross section M. The resin molded part 9, as described above, is located in the central area of the mold. Liquid flow input 20i and liquid flow output 20o are associated with cooling liquid flow path 20 and liquid flow input 21i and liquid flow output 21o are associated with cooling liquid flow path 21 respectively, and are provided at different planes of the molds along the X axis, i.e., the direction in which the molds move. Liquid flow input 20i, liquid flow output 20o, liquid flow input 21i, and liquid flow output 21o are considered plumbing interfaces for the mold(s).

The cooling liquid flow paths 20 and 21 follow separate paths from each other inside the mold(s) so that liquid flowing through one cooling liquid flow path will not exit from the other cooling liquid flow path to which external plumbing can be attached, but is not being used. In another exemplary embodiment, liquid is prevented from leaking from a cooling liquid flow path not being used, so two independent flow paths are not needed.

Stable cooling can be achieved by limiting the direction the cooling liquid flow paths 20 and 21 move in to only the X axis direction by installing them in the stationary side mold 12. If more than a certain ratio, e.g., more than half, of the cavity 14, which is located between the stationary side mold 12 and the movable side mold 13, is located in the movable side mold 13, the cooling efficiency can decrease when two cooling liquid paths are installed in the stationary side mold 12.

FIGS. 12B-12D illustrate views of mold A or mold B from the YZ plane. If the cavity 14 (not illustrated in FIGS. 12B-12D) is greater than a certain ratio in the stationary side mold 12, two cooling liquid paths can be installed in the stationary side mold 12 as illustrated in FIGS. 12C and 12D. If the cavity 14 (not illustrated in FIG. 12C or 12D) is less than a certain ratio in the stationary side mold 12, a cooling liquid path can be installed in the stationary side mold 12 and the movable side mold 13 respectively as illustrated in FIG. 12B.

Cooling efficiency can be achieved with the size of the cavity 14, as well as with the shape of the cavity 14. Depending on the shape of the cavity 14, the locations of the two cooling liquid paths can be determined so the cooling liquid paths can easily pass through the molds. When the shape of the cooling liquid paths in the molds becomes complicated, the cost of the molds rise proportionally. Thus, cooling liquid paths do not pass through molds that include complicated areas of, for example, the cavity 14.

Figure 13:
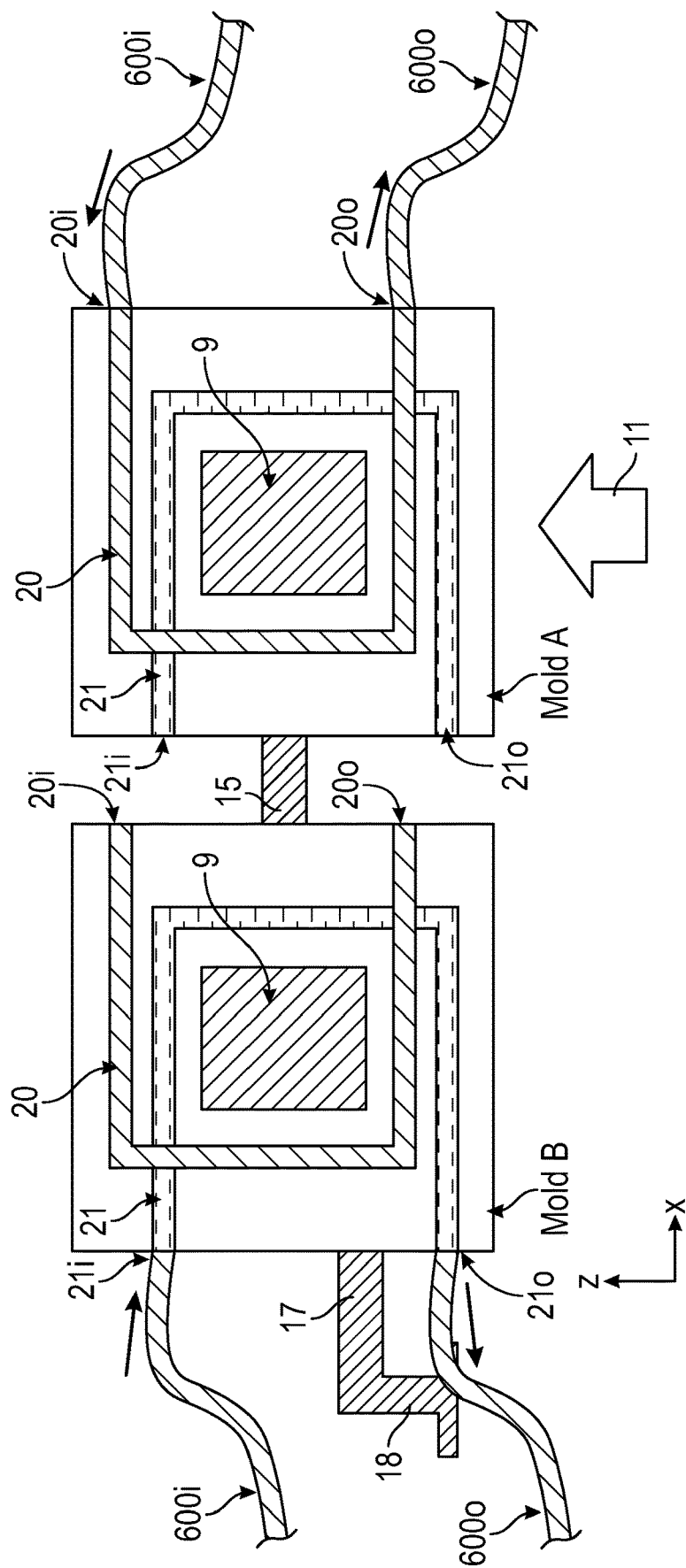
FIG. 13 illustrates cooling liquid flow paths inside molds.

FIG. 13 illustrates the cooling liquid paths if molds A and B are installed on the cart 300 and external plumbing that is attached/connected to the molds via respective inputs/outputs. More specifically, FIG. 13 illustrates the XZ plane with a view from the injection molding machine cylinder 11 side. Viewed from mold B, mold A is located in the plus direction of the X axis, and the actuator 18 is located in the minus direction of the X axis. When mold A moves from the injection molding machine 200 in the plus direction of the X axis, and mold B moves from the injection molding machine 200 in the minus direction of the X axis, both molds move outside the injection molding machine 200.

When molds have been installed, as in FIG. 13, mold A will use the cooling liquid path 20 and mold B will use the cooling liquid path 21. If the positional relationship between molds A and B is the opposite, mold A will use cooling liquid path 21 and mold B will use cooling liquid path 20.

With respect to mold A, plumbing 600$i$, which provides liquid to the cooling liquid flow path 20, is connected to liquid flow input 20$i$. Plumbing 600$o$, which enables liquid to leave the cooling liquid flow path 20, is connected to the liquid flow output 20$o$. With respect to mold B, plumbing 600$i$ is connected to liquid flow input 21$i$ and plumbing 600$o$ is connected to the liquid flow output 21$o$.

Connecting the plumbing, when a mold is installed, can be easily performed without having to enter the injection molding machine 200, regardless of the positional relationship of molds A and B. Since the plumbing does not pass between mold A and mold B, and does not go inside the injection molding machine 200, the possibility of issues such as clogging due to the plumbing getting caught between a mold and another structure inside the injection molding machine 200 or damage to the plumbing occurring can be reduced. In the case of FIG. 13, the cooling liquid path 21 of mold A and the cooling liquid path 20 of mold B are not used, and as such, are not connected to an external plumbing.

The use of conduits to provide electrical signals will be described with reference to FIGS. 14A-14B and FIG. 15. FIG. 14A illustrates a similar perspective view of mold A or mold B as in FIG. 12A. Like FIG. 12A, the center area of the mold is illustrated to simplify the description of the resin molded part 9.

Conduit connectors 22 and 23 facilitate connection of external electrical wiring inside the molds via conduit 2223. Conduit connectors 22 and 23 can be provided at different planes of the mold along the X axis and are located on opposite sides of the mold respectively in the moving direction of the mold. More specifically, conduit connectors 22 and 23 enable the external electrical wiring to reach connector 24, which is connected to the hot runner 2, via conduit 2223. Connector 24 is also connected to conduit 2223.

Connector 24 enables the external electrical wiring to reach a controller (not illustrated) associated with the hot runner 2. The external electrical wiring outside the molds is connected to controller 70. Thus, control unit 70 (see FIG. 9) can control the hot runner 2 via the electrical wiring provided via conduit connectors 22 and 23, conduit 2223, and connector 24.

Since conduit 2223 and conduit connectors 22 and 23 facilitate instructing or controlling the hot runner 2, conduit 2223, conductor 22, and conduit conductor 23 are located on the stationary side mold 12 where the hot runner 2 is located. Unlike the separate cooling liquid paths 20 and 21, conduit 2223 is a single path that intersects at connector 24. Unlike the cooling liquid paths, it is not necessary to ensure the paths of electrical wiring entering via conduit connector 22 and conduit connector 23 do not interfere with each other. On the contrary, in some instances, it can be beneficial to share circuits, printed circuit boards (PCBs), or other electronic devices to simplify the paths of electrical wiring associated with conduit conductor 22 and conduit conducti 23 respectively.

Figure 14C:
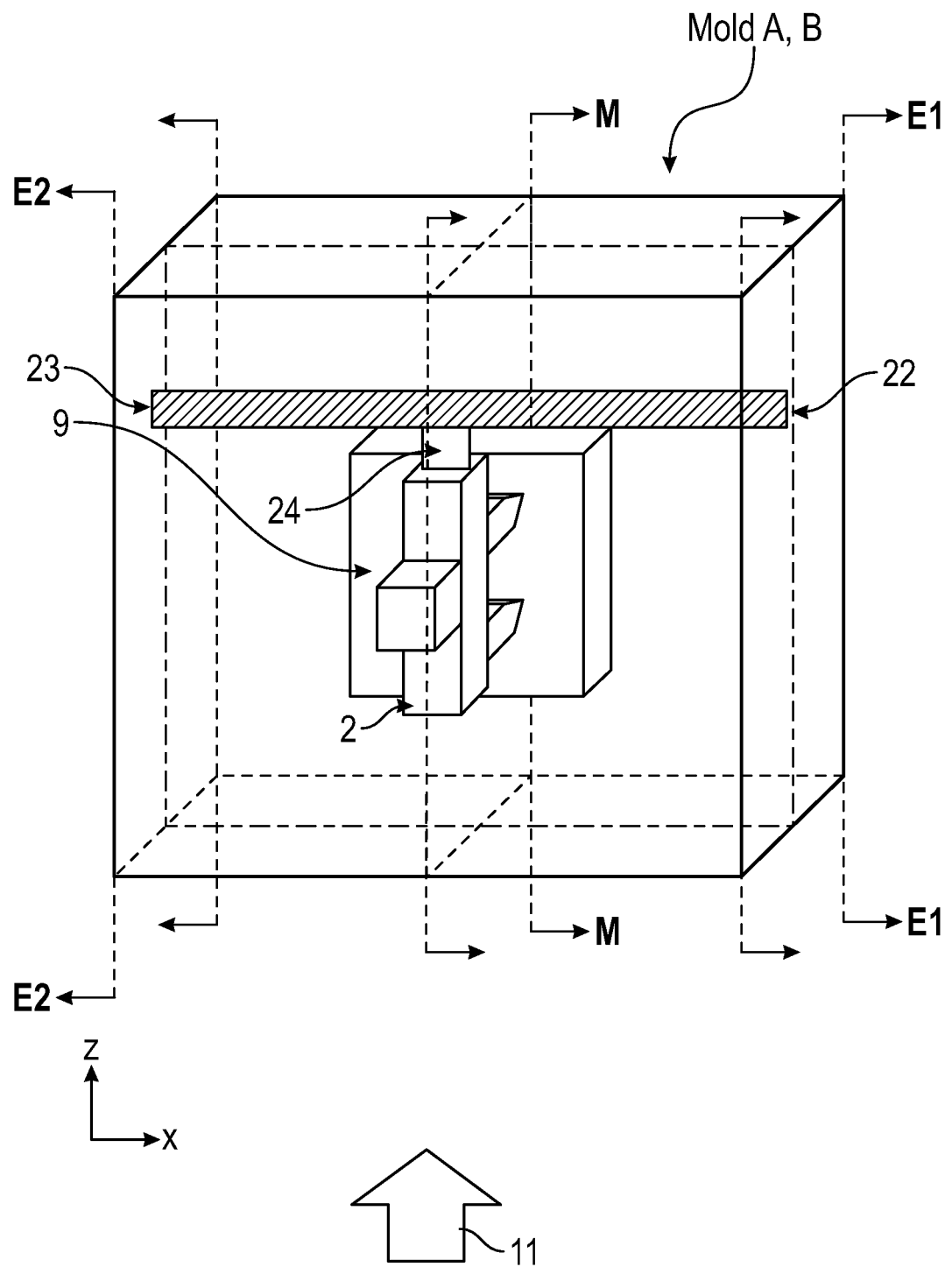
Figure 15:
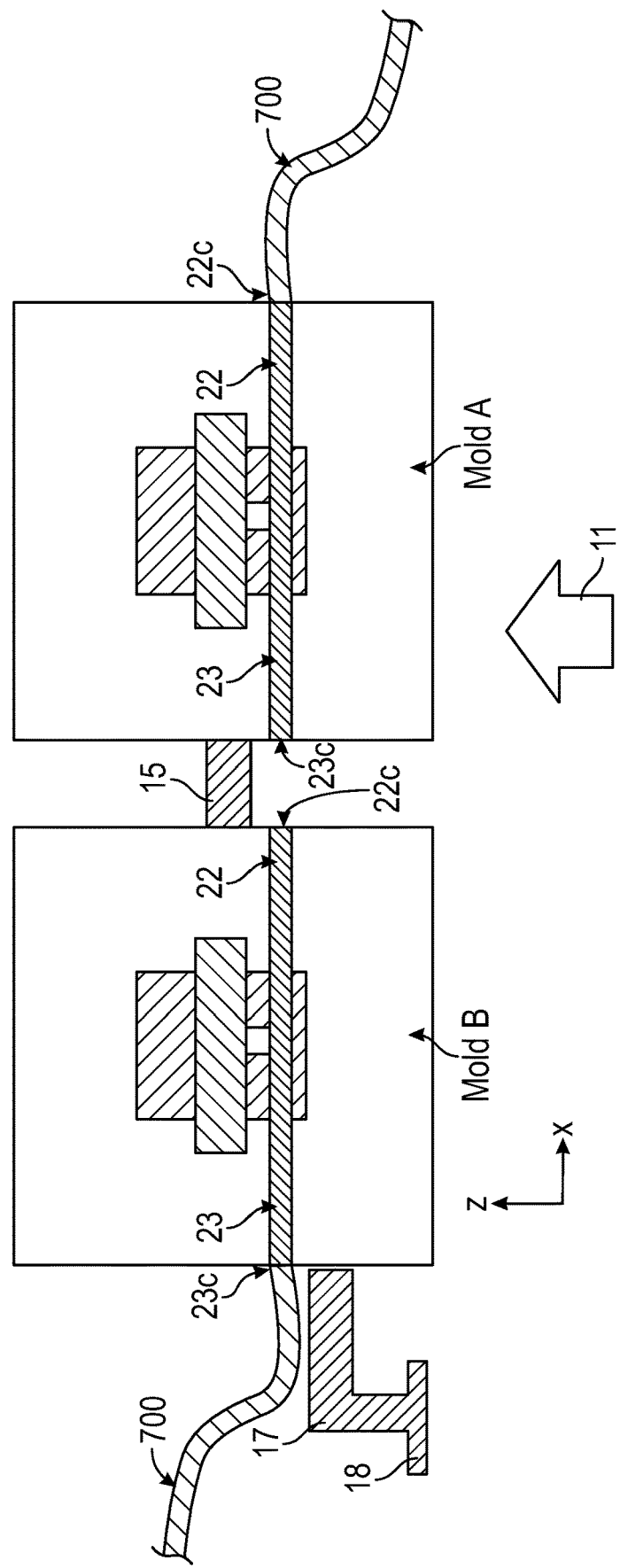
FIG. 15 illustrates installation of connectors.

FIG. 14B illustrates viewing mold A or mold B from the YZ plane. The paths of electrical wiring associated with either conduit connector 22 or conduit connector 23 can be connected with connector 24 via conduit 2223 on the hot runner 2 side regardless of the shape or size of the cavity 14. In another exemplary embodiment, the paths of electrical wiring associated with conduit connector 22 or conduit connector 23 can connect directly with the controller (not illustrated) associated with the hot runner 2 via conduit 2223 without using connector 24. The hot runner 2 can be aligned in any direction. While the hot runner 2 is aligned along the X axis in FIG. 14A, in FIG. 14C, the hot runner 2 is aligned along the Z axis FIG. 15 illustrates the structure of the electrical wiring connections if molds A and B are installed onto the cart 300 (not illustrated in FIG. 15). Conduit 700 can be located outside the injection molding machine 200 at two different planes per mold respectively in any direction. For example, the direction where the molds exit from the injection molding machine 200. The connection of conduit 700 when installing an additional mold can be easily accomplished regardless of the positional relationship of molds A and B. Conduit 700 contains electric wiring that is connected to the control unit 70. In mold A, the conduit 700 connects to conduit 2223 via conduit connector 22. In mold B, the conduit 700 is connects to conduit 22223 via conduit connector 23.

In another embodiment, for both the cooling liquid paths and the electrical wiring paths, two of each can be included in one mold. The operability of the operator is enhanced by providing the same layout of the cooling liquid path and the electrical wiring path on any surface of the molds.

As described above, by locating the plumbing and conduits for the molds and their associated connectors in the direction where the molds exit the injection molding machine 200, it is possible to reduce potential jamming of plumbing and conduits inside the injection molding machine 200 or plumbing or conduits being damaged. Since it is possible to connect external plumbing and/or external conduits on each of the two surfaces of the molds, located in the moving direction of the molds, it is possible to install the internal plumbing and/or internal conduits such that they exit the injection molding machine 200 regardless of the positions of the molds. The above-described liquid flow inputs (20$i$, 21$i$), liquid flow outputs (20$o$, 21$o$), conduit connectors (22, 23) can collectively be referred to as the "external connection unit". The external connection unit enables connection of devices, units, etc. external to the injection molding machine and operation of predetermined processes with respect to the molds.

When a user wants to change a mold in a certain position to another mold, if the mold to be placed in the certain position has two sets of plumbing and two sets of conduits with the same function in two different planes, the user can easily change the mold. Because the user does not need to be concerned about which mold can be placed in the certain position, the user does not need to choose another mold that will be placed in another position so that two molds can be appropriately placed. Two inputs/outputs for the plumbing and conduit in different planes of the mold enables the user to choose any two mold combination, resulting in higher production performance.

For example, after the mold of position A has been exchanged from mold 1 to mold 2, and after the mold of position B has been exchanged from mold 3 to mold 4, it is possible to exchange the mold of position A from mold 2 to mold 3. Because the molds can be installed regardless of the position, work in the position to be exchanged may only be performed.

The following describes two different planes where two sets of plumbing and conduits have the same function. The same function refers to, for example, inputting liquid to cool down a mold, outputting liquid used to cool down a mold, and controlling a hot runner to communicate with a control unit.

FIGS. 16A-16B illustrate the connection elements of the present embodiment. FIG. 16A illustrates surface E1, which is the Y-Z plane of the mold A or the mold B and illustrated in FIGS. 12A, 14A, and 14C. FIG. 16B illustrates surface E2, which is the Y-Z plane of the mold A or B, and is also illustrated in FIGS. 12A, 14A, and 14C. E1 and E2 are different planes of the Y-Z plane of the mold A or B, and are opposite planes of each other.

The mold A or B includes the liquid flow input $20i$ in E1 and the liquid flow input $21i$ in E2, which as described above, are used to connect to external plumbing for inputting liquid. The mold A or B also includes the liquid flow output $20o$ in E1 and the liquid flow output $21o$ in E2, as described above, are used to connect to external plumbing for outputting liquid. E1 and E2 also include conduit connectors 22 and 23. Thus, depending on the position of the mold, the user can choose to use either the external connection unit on E1 or the external connection unit on E2. FIGS. 16A-16B illustrate one example of the external connection unit, where the external connection unit can be arranged in either the stationary-side mold 12 or the moving-side mold 13.

The mechanism to attach the link 15 and the link 17 is also located on both the E1 and E2 plane. E1 includes the liquid flow connection elements $20i$, $20o$ and the conduit connection element, $22c$, a mechanism to attach the link 15, and a mechanism to attach the link 17. E2 includes the liquid flow input $21i$, the liquid flow output $21o$, conduit connection element $23c$, the mechanism to attach the link 15, and the mechanism to attach the link 17. The mechanism to attach the link 15 and the mechanism to attach the link 17 can be single mechanism.

Turning back to FIGS. 18A-18B and FIGS. 19A-19B, in another exemplary embodiment, two independent air pipes can be installed in the mold like the cooling liquid paths. One air inlet connectable to one air pipe can be installed at one side of the mold, and the other air inlet connectable to the other air pipe installed at the other side of the mold. The other side of the mold is opposite to the one side of the mold.

Figure 8A:
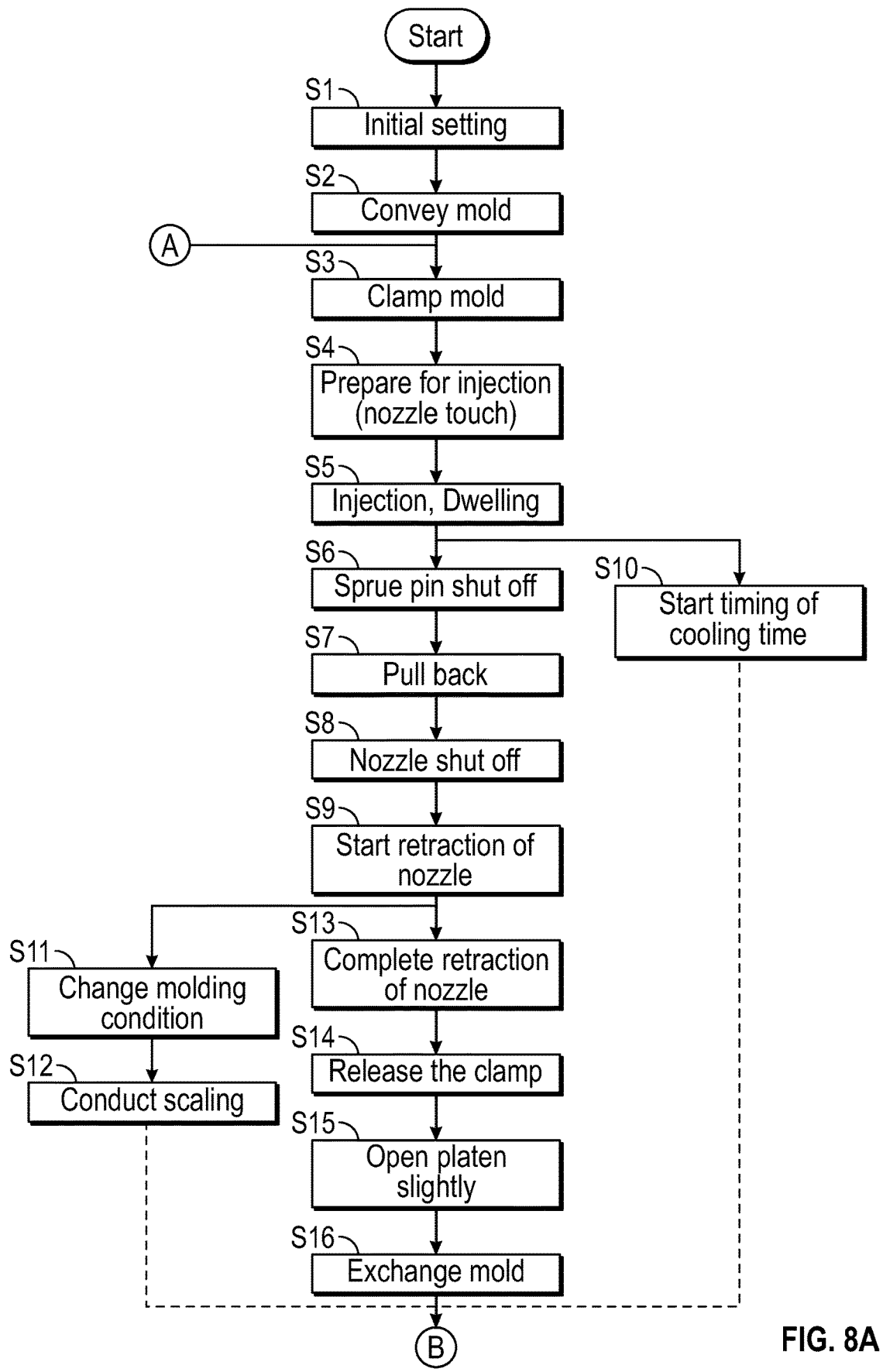
FIGS. 8A-8B illustrate a process of the injection molding system.
Figure 8B:
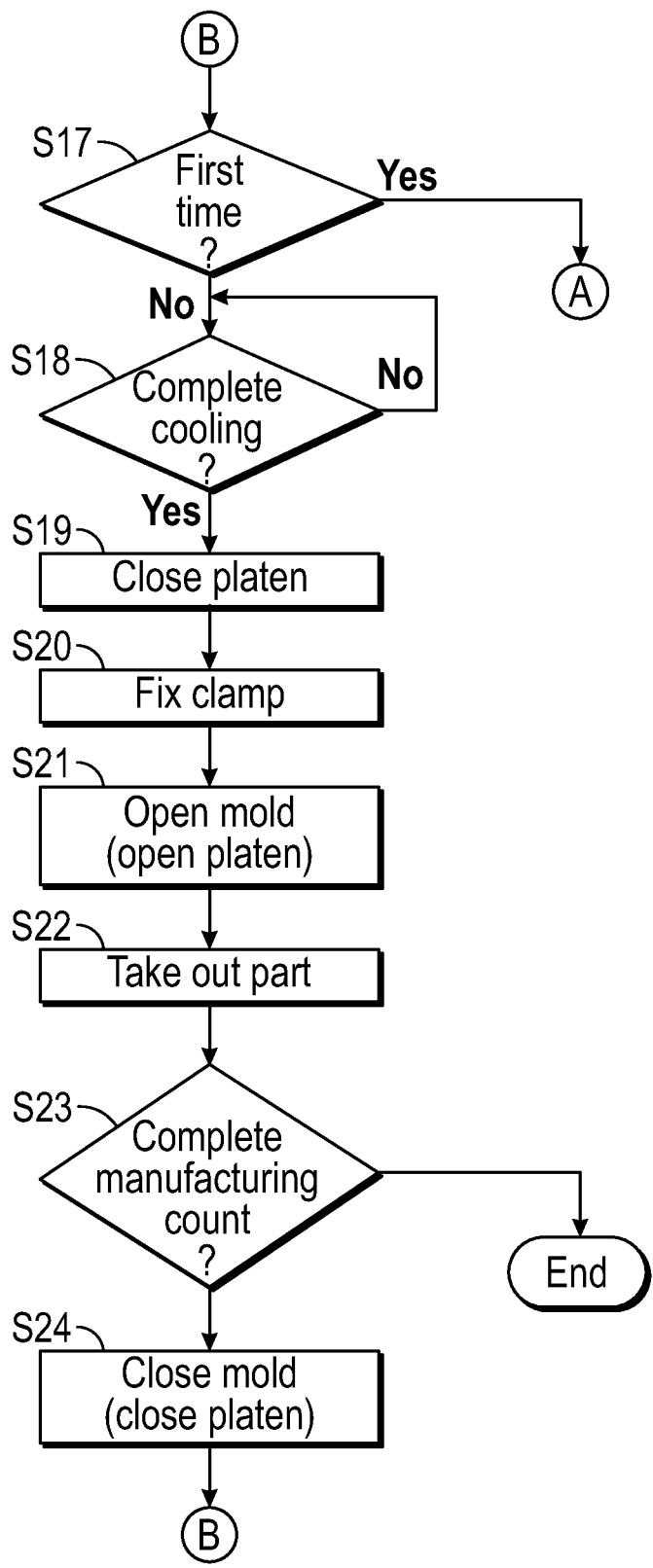

FIGS. 8A-8B are a flowchart illustrating an example of processing executed by the controller 70. Each step in the flowchart of FIGS. 8A-8B is described with reference to the respective states in FIGS. 1-7 and FIGS. 9-11. In the following example, a case in which a molding operation is performed while alternating mold A and mold B, e.g., molding using the mold A→molding using the mold B→molding using the mold A, etc.

An initial setting is performed in S1. Here, for example, for each of the metallic molds A and B, operation conditions of the injection equipment 201 and the clamping device 58 are registered. These include, For example, the amount of resin that is injected at one time, the temperature, the injection speed, the clamping force, the initial value of the position of the second movable platen 55 in relation to the tie-bars 59, etc. These conditions can differ even when mold A and mold B are the same. When mold A is used for the first molding operation, the conditions, related to mold A, are automatically set as the operating conditions. In addition, heating of the injection molding machine cylinder 11, and plasticizing and measuring of the resin, etc. is started for the first time.

In S2, mold A is conveyed into the injection molding machine 200. The motor 57 for sliding the movable platen is driven to cause the space between the stationary platen 53 and the first movable platen 54 to become slightly wider than the thickness of mold A (the width in the Y direction), so that mold A can be slid between the stationary platen 53 and the first movable platen 54. Next, the controller 70 controls loading mold A and driving the actuator 18 to load mold A into the injection molding operation position. When loading has completed, a signal indicating load completion is transmitted to the controller 70. Upon receipt of the signal indicating load completion, the motor 57 is driven to cause the stationary platen 53 and the first movable platen 54 to make close contact with mold A. At this time, a clamping force is not needed as it will occur during molding. In addition, mold A is locked to both the stationary platen 53 and the first movable platen 54 by driving of the fixing mechanisms 60.

In S3, clamping of mold A by the stationary platen 53 and the first movable platen 54 is performed by driving the motor 57 to drive the toggle mechanism. The toggle mechanism consists of several links that can rotate against each other, and can change the distance between the first movable platen 54 and the second movable platen 55. Thus, it is possible to strongly clamp the mold.

In S4, preparation for injection in relation to molds A and B is performed. Here, the actuator 57 is driven to move the injection equipment 201, causing the injection molding machine nozzle 1 to contact mold A. The actuator 57 is the driving source to move the movable platen. The injection preparation includes the injection molding machine nozzle 1 contacting the mold and moving the valve pin 6 and the sprue pin 7 to open the flow path of the resin.

In S5, injection and dwelling of molten resin is performed. The injection equipment 201 is driven to fill molten resin into the cavity 14 in mold A from the injection molding machine nozzle 1, and to press the resin in the injection molding machine cylinder 11 into mold A at a high pressure to compensate for the volume decrease due to resin solidifying. Upon the processing of S5, the actual clamping force is measured by the sensor 68. During molding, mold A thermally expands due to the temperature of mold A gradually rising. In some instances, a difference arises in the initial clamping force and the clamping force after a period of time has passed. Accordingly, it is possible to correct the clamping force at the time of the next clamping based on the result of the measurement by the sensors 68.

The adjustment of the clamping force is performed by an adjustment of the position of the second movable platen 55 in relation to the tie-bar 59 by driving the motor $55c$. This can enhance the precision of the clamping force by adjusting the clamping force by correcting the initial value of the position of the second movable platen 55 in relation to the tie-bars 59 based on the result of the measurement by the sensors 68. The adjustment of the position of the second movable platen 55 in relation to the tie-bars 59 can be performed with any timing.

In S6, the sprue pin 7 is moved to the injection molding machine nozzle 1 side to ensure that resin does not leak from the sprue 4 side of the hot runner 2. The flowing in the opening to the cavity 14 is stopped with the valve pin 6.

In S7, pull-back of the molten resin present in the vicinity of the exit of the injection molding machine nozzle 1 is performed. The screw 51 is sent backwards by retracting it in the opposite direction of the injection molding machine nozzle 1. The resin located in the vicinity of the exit of the injection molding machine nozzle 1 is returned inside the injection molding machine nozzle 1.

In S8 the supply of resin to the injection molding machine nozzle 1 stops, and the injection molding machine nozzle 1 is closed with the shut-off nozzle 49.

In S9, the retraction of the injection molding machine nozzle 1 begins. As illustrated in FIG. 5, the injection molding machine nozzle 1 separates from the mold. At this time, because the sprue 4 is sealed off in S6 with the sprue pin 7, it is difficult for reverse flow of resin to occur. Injection molding machine nozzle 1 is sealed off with the shut-off nozzle 49 before separation of the injection molding machine nozzle 1, and it is difficult for resin leaks from the injection molding machine nozzle 1 to occur. Additionally, due to the foregoing pull back, the resin, present in the resin flow path of the injection molding machine nozzle 1, decreases, and resin leaks from the injection molding machine nozzle 1 become more difficult. As a result, there is no resin accumulating between the injection molding machine nozzle 1 and the sprue 4, so it is more difficult for air to enter into the injection molding machine 1 nozzle. Even when conducting molding continuously, the possibility that operation of the injection molding machine 200 stops due to clumps of resin getting caught in between parts of the injection molding machine 200 will reduce.

Since the resin leaks from the injection molding machine nozzle 1 become less, the retraction of the injection molding machine nozzle 1 can be performed simultaneously with resin scaling described below in 512. The scaling of resin be performed in parallel because resin does not leak out of the injection molding machine nozzle 1, even when retracting the injection molding machine nozzle 1.

In S10, the timing of the cooling time of the mold injected into the cavity 14 in S5 begins.

In S11, the injection molding conditions of the injection molding machine 200 change along with the mold change. More specifically, previously set injection molding conditions are changed to the injection molding conditions of the mold to be injected from this point on. Since it is necessary to conduct resin scaling that matches the injection molding conditions of mold B (or mold A), mold A (or mold B) is transported outside the injection molding machine 200 at S16, described below, mold B (or mold A) is carried into the injection molding machine 200, and injection/dwelling for mold B (or mold A) is implemented.

The injection molding conditions set in S1 or S11 include all the processes from after the mold enters into the injection molding machine 200 until it exits, such as the moving amount of the molds, the timing of movement, the timing of contacting/separating of the injection molding machine nozzle 1, and the timing of the pull back, etc. Therefore, controlling the processes until the injection molding machine nozzle 1 retracts from the mold in question entering as one set of processes makes it easier to manage should any issues arise.

If the nozzle retraction occurs before the scaling in 512, which is performed after S11 completes, there is a possibility that resin leaking will occur from the injection molding machine nozzle 1 due to the backpressure during the scaling. As a result, resin accumulates between the injection molding machine nozzle 1 and the sprue 4. Back pressure is the pressure when the injection molding machine nozzle 1 is retracted and that occurs in the direction of the resin coming out of the tip side of the injection molding machine nozzle 1. When the accumulated resin becomes large, there is a possibility that it can become sandwiched between the internal parts of the injection molding machine 200. While the resin scaling performed in S12 is, in general, necessary for several seconds to more 10 seconds, this can vary depending on the size of the injection molding machine. Thus the changing of the injection molding conditions in S11 to perform the scaling after the retraction of the injection molding machine nozzle 1 occurs. As a result, it is possible to reduce the possibility of resin reverse flowing from the sprue 4 due to residual pressure in the hot runner 2 and the resin leaking.

In S12, scaling of the resin occurs in based on the injection molding conditions set in S11.

In S13, retraction of the injection molding machine nozzle 1 is completed.

In S14, the fixing mechanisms (clamps) 60 are released. As illustrated in FIG. 10, the fixing mechanisms 60 are mechanisms to secure the molds to the stationary platen 53/the first movable platen 54. To alternate the molds, the fixing mechanisms 60 fixed to the clamping plates 12a and 13a of the stationary platen 53/the first movable platen 54 removed.

In S15, the first movable platen 54 moves slightly in the direction of separation from the stationary platen 53. As a result, the mold that could not move in the Y axis direction because the mold was clamped by the stationary platen 53 and the first movable platen 54 can move. More specifically, moving in the X axis direction is enabled without the mold making contact with the stationary platen 53 and the first movable platen 54, and without friction occurring.

In S16, exchanging of the molds occurs. More specifically, while one mold enters the injection molding machine 200, the other mold exits the injection molding machine 200. Because the two molds are linked via the linked unit 15, entering and exiting the injection molding machine 200 can occur simultaneously via movement of the actuator 18.

Since Steps S11-12 and S13-16 are performed in parallel, increased manufacturing efficiency is obtained.

In S17, it is determined whether it is the first molding operation with the mold present in the injection molding machine 200. It can also be determined whether there is a molded part in the mold.

If it is the first molding operation, the process returns to S3 and steps S3 through S16 are executed for a different mold. If it is a second or subsequent molding operation, the process proceeds to 518. If it is determined in 517 that the injection and dwelling of the mold currently inside the injection molding machine 200 is the first molding operation after the current count has started, then there is no resin molded part 9 inside the mold. Therefore, the process proceeds to S3 because there the process of removing a molded part as described below with respect to S18-S22 is not applicable.

In S18, it is determined whether cooling of the mold that is inside the injection molding machine 200 is completed based on whether the cooling time that started in S10 has reached a predetermined time. If cooling is completed, the process proceeds to S19. Otherwise, the process remains at S18 until the predetermined time has been reached.

In S19, the stationary platen 53 and the first movable platen 54 are closed, sandwiching in the. Movement of the first movable platen 54 is as described above with respect to S15.

In S20, the stationary platen 53/first movable platen 54 and the clamping plates 12a and 13a of the mold are fixed with the clamps 60. As a result, it becomes difficult for the mold to move in the X axis direction and Y axis direction.

In S21, the movable mold 13 and the stationary mold 12 are opened against the first movable platen 54 and the stationary platen 53. This enables removal of the resin molded part 9 located between the movable mold 13 and the stationary mold 12. The first movable platen 54 is separated from the stationary platen 53 by driving the motor 57. The stationary mold 12 is secured to the stationary platen 53 by the fixing mechanisms 60 and the movable mold 13 is secured to the first movable platen 54 by the fixing mechanisms 60. Thus, the movable mold 13 separates from the stationary mold 12 and the mold is opened against the magnetic force of the self-closing unit 301.

In S22, the resin molded part 9, which became removable due to the opening of the mold in S21, is removed. The molded part, remaining on the side of the movable mold 13 of the mold, is removed and conveyed outside the injection molding machine 200. In one exemplary embodiment, removal of the molded part can be achieved using a robotic assembly. The resin molded part 9 can be removed by an ejection mechanism (not illustrated) or by moving a vacuum head (not illustrated) up to the location of the resin molded part 9 and applying vacuuming force.

In S23, whether a manufacturing count of the resin molded part is completed is determined. The determination is based on the passing of a predetermined time or on whether a predetermined production number has been manufactured. The criteria for making the determination can also be the amount of resin that was used instead of the predetermined time or the production number.

If conducting assembly after the resin molded part was manufactured, manufacturing only a partial part in a large amount can take up space inside a manufacturing facility. In this scenario, the determination can be based on whether the volume was manufactured based on other assembly parts in the production line. If it is determined in S23 that the production count of the resin molded part is completed, the process of FIGS. 8A-8B end. Otherwise, the process proceeds to S24.

In S24, the first movable platen 54 that was opened in S21 is closed against the stationary platen 53. This results in the movable mold 13 and the stationary mold 12 being closed. The process then returns to S3.

Injection molding to two molds has been described above. In the above-described embodiment, the shut off is performed with the sprue pin 7 in S7. Even when retracting the injection molding machine nozzle 1 without waiting for the scaling of the resin, air is prevented from entering the hot runner 2. This can result in a reduction in cycle time.

Since the nozzle shut-off as described in S7 and S8 is performed, it is possible to perform both the retraction of the injection molding machine nozzle 1 and the scaling at the same time without resin leaking from the injection molding machine nozzle 1 side.

The setting of the injection molding condition matching each mold described in S11 can occur before the start of the nozzle shut-off in S8 and the retraction of the injection molding machine nozzle 1 in S9. In the above-described embodiment, the setting changes of S11 were done after the start of the retraction of the injection molding machine nozzle 1 in S9. Because the processes of S8 and S9 are processes associated with the side of the injection molding machine 200, it is not necessary to perform the process of S11 after the process of S9. However, in instances of molds where the position of the nozzle contact area 25 is different are used, the possibility exists that performing the change of the injection molding conditions before S9 may make it impossible to align the movement of the injection molding machine nozzle 1 in S9 with the mold. In those instances, it is better to conduct the change of the injection molding conditions in S11 after the start of the retraction of the injection molding machine nozzle 1 in S9.

The process of S11 can be implemented before the pull back of S7. However, the amount and strength of the pull-back differs depending on the mold. Therefore, when changing the injection molding conditions before S7, the pull back that was in the mold that performed injection in S5 just before becomes impossible. Performing the following addresses this issue. More specifically, if setting a common pull back amount that matches the larger pull back from among the two differing molds, S11 can be performed prior to S7. In addition, because the process of setting changes in S11 can take time, manufacturing efficiency can be improved by conducting the setting changes in S11 in parallel to other processes.

As illustrated in FIG. 8A, S11 is performed after the start of the timing of the cooling time of S10. Because the cooling time depends on the molding conditions of each mold, when setting them in the same way, there is a possibility that the cooling time may be insufficient or the manufacturing efficiency will decrease. In another exemplary embodiment, if the cooling time is the same for two molds, or even when conducting cooling based on the mold with the longer cooling time, S11 can be performed before S10.

In another exemplary embodiment, the process of exchanging the molds in S16 can be performed after scaling of the resin in S12. While exchanging of the molds can occur after scaling, this may result in cycle time becoming longer than actual cooling time needed since delaying the exchanging of the molds until scaling can lead to the time of mold exchange exceeding the cooling time.

The above-described embodiment discussed two molds, but this is not seen to be limiting, and the above-described embodiment is applicable to three or more molds. The above-described embodiment also discussed that the movement of the mold was in the direction of the X axis against the injection molding machine 200 that was installed along the direction of the Y axis, but this is not seen to be limiting. For example, movement can be in the direction of the Z axis, and movement corresponding to drawing a circle passing through the injection position of the injection molding machine 200 is also applicable.

The positions where cooling is performed are not limited to being located external to injection molding machine 200. For example, while cooling takes time, in the case of small molds such as those that enable conducting resin injection at a higher speed, cooling can occur at multiple positions. In the case of injection molding for three or more molds, the molds can be moved outside the injection molding machine 200 based on the cooling times, thus enabling prioritization of moving a mold whose cooling time has expired into the injection molding machine 200.

At the time of opening and closing of the platen, the molds must avoid contacting the platen to the degree of generating a frictional force that can hinder the movements during mold moving. Therefore, the actual movement amount in the direction of the Y axis of the molds is extremely small. However, rollers can be installed so that the rollers move in the direction of the Y axis. Enabling the rollers to move in the direction of the Y axis provides for application of additional mold clamping force to the mold.

The opening and closing of the platen, is performed with the mold on the rollers 63. At this time, the mold moves slightly in the direction of the Y with an open condition or closed condition of the platen. Since the mold can fall off the rollers 63 when the platen is in the open condition if the size of the rollers 63 in the Y axis direction is too short, the size of the rollers should be such that they mold remains on the rollers 63 regardless of whether the open or closed condition of the platen.

While the above-described embodiment describes rollers on the cart 300, in another exemplary embodiment, rollers can be added to the molds instead of the cart 300. By adding rollers to the molds, the vibrations to the molds due to step differences between the rollers can be reduced. When manufacturing high precision parts, this can ensure that the molds do not shift due to vibration, increasing the probability of producing molded parts with high precision. In addition, reducing damage to the rollers can be achieved.

As illustrated in FIG. 10, the clamps 60 are tightened with a strong force to achieve clamping when they enter their respect hole sections on clamping plates 12*a* and 13*a*. A high probability exists that the holed areas can become chafed or worn due as a result of repeated clamping. In an exemplary embodiment, to ensure that if/when any portion of any hole wears out, the entire mold does not need to be exchanged, hole sections of the clamping plates 12*a* and 13*a* are designed to be replaceable.

FIG. 10 of the above-described embodiment illustrates that the roller unit 61*a* is installed on the stationary platen 53 or the first movable platen 54 to cause the movement of the mold in the XZ plane. At this time, if there is a hole in the position where it makes contact with the roller unit 61*a* on the mold side, there is a possibility that the roller unit 61*a* will enter the hole and be damaged. In another exemplary embodiment, it is possible to have the mold move smoothly by not providing a hole in the position that is on the XZ plane of the mold and makes contact with the roller unit 61*a* of the platen inside the injection molding machine 200.

The section of the mold that contacts the roller unit 61*a* can deform due to the mold moving multiple times. To address this, the hardness of the material of the section of the mold that contacts the rollers of the roller unit 61*a* can be lower than the hardness of the rollers, while the hardness is higher for the reaming sections of the molds. Since the wear on the roller side will be greater when the hardness of the mold is higher than the hardness of the rollers, the hardness of the rollers should be made higher. In another exemplary embodiment, the section of the mold that contacts the rollers is replaceable.

If the time required for all processes from the start of the mold exchange process, to the other mold ejecting process, injection process and dwelling process, and until completion of the mold exchange process again, fits into the time required for the cooling of one of the molds, then, productivity is improved two-fold compared to normal molding. That is, high productivity can be achieved while suppressing any cost increases. The two-fold increase in productivity can be realized for a wide range of molded parts.

In order to realize a two-fold increase in productivity, the cooling time of the molds can take up to 50% or more of the total molding process (the time for one molding cycle), where this depends on the time for the mold replacement process. Many molded parts used for exterior covering parts or electromechanical parts, such as for automobiles, home electric appliances, office devices, etc., have a thickness of several millimeters to ensure strength. Accordingly, during the total molding process, the cooling process takes up the longest time, and it is not uncommon for the time to cool the molds to reach from 50% up to 70% in relation to the time of one molding cycle. Accordingly, the foregoing embodiment is particularly effective in improving productivity of this type of molded part. The productivity can particularly be improved if the time for the injection molding cycle of mold A and the time for the injection molding cycle of mold B are approximately the same, and the time for cooling the molds in relation to the time for one molding cycle is 50% or more.

Even if the time to cool the molds is less than 50% of the time for one molding cycle, effective application of the time for cooling enables the realization of a 1.5 times to 1.8 times higher productivity in relation to normal molding. By virtue of the foregoing embodiment, the installation space and the power consumption amount are reduced because it is possible to achieve the productivity of two injection molding machines by the conventional manufacturing method in the one injection molding machine 200.

While the above-described embodiment is described using resin, this not seen to be limiting, and any material, such as wax or metal, is applicable.

In another exemplary embodiment, a runner can be used without a heater or thermal insulation for the mold.

What is claimed is:

1. A mold comprising:
   a first mold part and a second mold part, wherein the first mold part has a first surface and a second surface, wherein the second mold part has a third surface, wherein the first surface of the first mold part has an opening, and wherein the first mold part and the second mold part form a cavity when the second surface and the third surface contact each other;
   a sprue formed in the first mold part, wherein the sprue is configured to receive, via the opening, a flow of resin from a nozzle of an injection molding machine;
   a runner formed in the first mold part, wherein the runner includes a first path, and wherein the sprue and the cavity are in fluid communication via the first path;
   a first pin configured to move to a first position to decrease a size of the first path and to move to a second position to increase the size of the first path, wherein the first pin includes a proximal portion and a distal portion, wherein the proximal portion is closer to the opening than the distal portion; and
   a plurality of surfaces that define a space,
   wherein the distal portion of the first pin moves within the space, and
   wherein, when the first pin moves from the second position to the first position, the first pin moves in a first direction and a first surface of the plurality of surfaces stops the movement of the first pin in the first direction.

2. The mold according to claim 1,
   wherein in the first position, the first pin extends though at least part of the sprue.

3. The mold according to claim 2,
   wherein, in the first position, the first pin extends though at least half of a length of the sprue.

4. The mold according to claim 1, wherein the second position is located downstream of the first position in a direction from the opening toward the cavity.

5. The mold according to claim 1, wherein, when the first pin moves from the first position to the second position, the first pin moves in a second direction and a second surface of the plurality of surfaces stops the movement of the first pin in the second direction.

6. The mold according to claim 2, wherein an outer diameter of the proximal portion of the first pin is less than an inner diameter of the sprue.

7. The mold according to claim 1,
   wherein the runner further includes a second path formed in the first mold part, wherein the opening and the cavity are in fluid communication via both the first path and the second path; and
   a second pin configured to move to move to a third position to increase a size of the second path and to move to a fourth position to decrease the size of the second path, wherein the fourth position is located downstream of the third position in a direction from the opening toward the cavity.

8. The mold according to claim 1,
wherein the first pin is configured to be moved from the second position to the first position by a force provided by a supply of air to the space.

9. The mold according to claim 1,
wherein the first pin is configured to be moved from the second position to the first position by a force provided by a fluid actuator.

10. The mold according to claim 1,
wherein, when the first pin moves from the second position to the first position, the proximal portion of the first pin moves within the sprue and the first path free from interference from any part of the mold.

11. A manufacturing method comprising:
conveying a mold to a first position, wherein the mold includes
- a first mold part and a second mold part, wherein the first mold part has a first surface and a second surface, wherein the second mold part has a third surface, wherein the first surface of the first mold part has an opening, and wherein the first mold part and the second mold part form a cavity when the second surface and the third surface contact each other,
- a sprue formed in the first mold part, wherein the sprue is configured to receive, via the opening, a flow of resin from a nozzle of an injection molding machine,
- a runner formed in the first mold part, wherein the runner includes a first path, and wherein the sprue and the cavity are in fluid communication via the first path,
- a first pin configured to move to a first position to decrease a size of the first path and to move to a second position to increase the size of the first path, wherein the first pin includes a proximal portion and a distal portion, wherein the proximal portion is closer to the opening than the distal portion, and
- a plurality of surfaces that define a space,
- wherein the distal portion of the first pin moves within the space, and
- wherein, when the first pin moves from the second position to the first position, the first pin moves in a first direction and a first surface of the plurality of surfaces stops the movement of the first pin in the first direction; and injecting resin into the cavity via the opening, the sprue, and the runner.

* * * * *